United States Patent
Fletcher et al.

[11] 3,891,311
[45] June 24, 1975

[54] MULTIPARAMETER VISION TESTING APPARATUS

[76] Inventors: James C. Fletcher, Deputy Administrator of the National Aeronautics and Space Administration, with respect to an invention of Stacy R. Hunt, Jr., King of Prussia; Robert J. Homkes, Willow Grove; Wilmer B. Poteate, West Chester; Andrew C. Sturgis, Exton, all of Pa.

[22] Filed: Sept. 10, 1973

[21] Appl. No.: 395,495

Related U.S. Application Data

[63] Continuation of Ser. No. 160,371, July 7, 1971, abandoned.

[52] U.S. Cl. ............................................. 351/38
[51] Int. Cl. ............................................ A61b 3/00
[58] Field of Search ......... 312/350; 351/17, 32, 37, 351/38

[56] References Cited
UNITED STATES PATENTS

| | | | |
|---|---|---|---|
| 3,172,404 | 3/1965 | Copenhaver et al. | 351/17 X |
| 3,205,505 | 9/1965 | Fletcher et al. | 351/32 |
| 3,263,627 | 8/1966 | Russell, Sr. | 351/38 X |
| 3,603,674 | 9/1971 | Abromarage et al. | 351/37 |

FOREIGN PATENTS OR APPLICATIONS

| | | | |
|---|---|---|---|
| 1,220,082 | 6/1966 | Germany | 351/38 |

*Primary Examiner*—Paul A. Sacher
*Attorney, Agent, or Firm*—Russell E. Schlorff; John R. Manning; Marvin F. Matthews

[57] ABSTRACT

Compact vision testing apparatus is provided for testing a relatively large number of physiological characteristics of the eyes and visual system of a human subject. The head of the subject is inserted into a viewing port at one end of a light-tight housing containing various optical assemblies. Visual acuity and other refractive characteristics and ocular muscle balance characteristics of the eyes of the subject are tested by means of a retractable Phoroptor assembly carried near the viewing port and a film cassette unit carried in the rearward portion of the housing, the latter selectively providing a variety of different visual targets which are viewed through the optical system of the phoroptor assembly. Various Maddox rod, Risley prism, occluder, lens and other optical devices are carried by the Phoroptor for selective positioning before one or both of the eyes of the subject. A multi-positional partially-retractable field mapping assembly is located within the forward end of the housing for mapping the visual field of the subject along different meridian lines, both with a white test object and with test objects of different colors. The visual dark adaptation characteristics and absolute brightness threshold of the subject are tested by means of a projector assembly which selectively projects one or both of a variable intensity fixation target and a variable intensity adaptation test field onto a viewing screen located near the top of the housing. A system of retractable mirrors is provided at the forward end of the housing for enabling the subject to observe this viewing screen. The film cassette unit is carried by an inner box assembly which also carries a Dolman rod unit for testing the visual depth perception of the subject. Such inner box assembly is provided with an elevator mechanism so that either the film cassette unit or the Dolman rod unit can be positioned in line with the eyes of the subject. A mechanism is also provided for testing the visual critical fusion frequency of the subject.

12 Claims, 10 Drawing Figures

PATENTED JUN24 1975 3,891,311

SHEET 1

PATENTED JUN 24 1975  3,891,311

SHEET 2

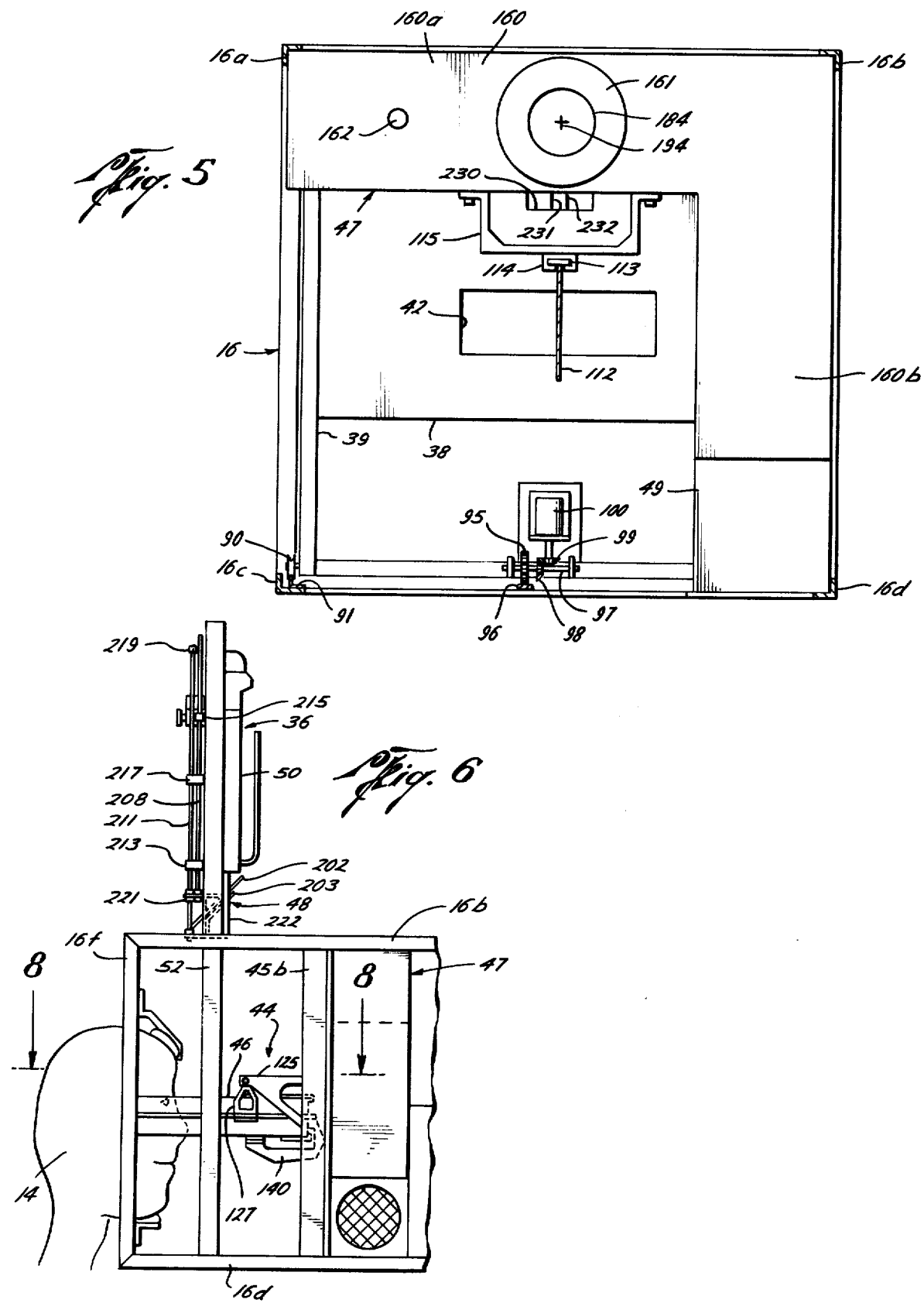

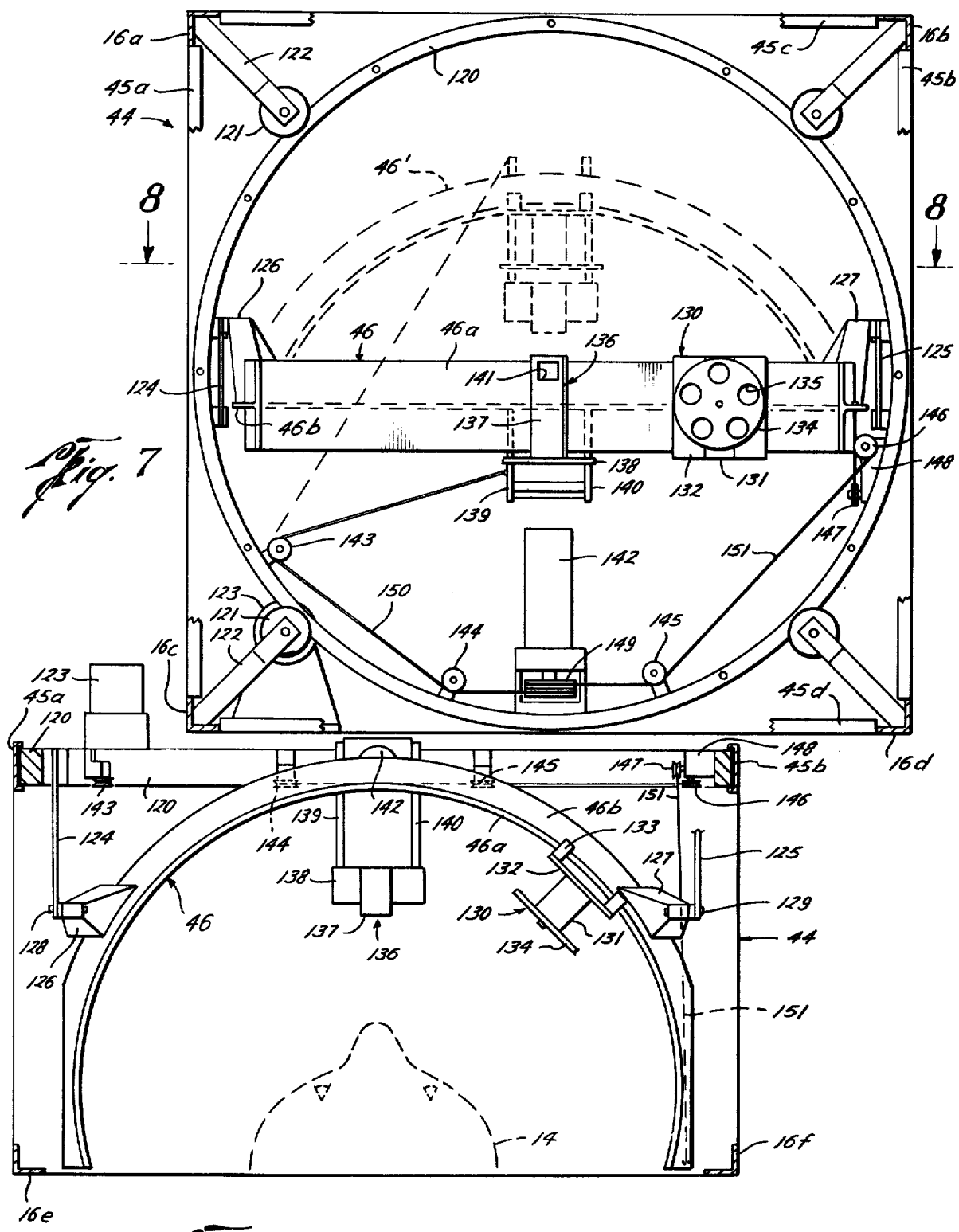

MULTIPARAMETER VISION TESTING APPARATUS

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

This is a continuation of application Ser. No. 160,371, filed July 7, 1971, now abandoned.

BACKGROUND OF THE INVENTION

This invention relates to vision testing apparatus for testing the eyes and visual system of a human subject and, particularly, to vision testing apparatus for testing a relatively large number of different characteristics of such visual system.

The integrity of the human visual system is of critical importance for crew performance and survival during space flight. As is known, various conditions encountered in the extra-terrestrial environment may serve to significantly alter the performance of the human visual system. For example, the absence of gravity during a prolonged space flight or residence in space may result in changes in eyeball configuration and extra-ocular muscle performance which cause a deterioration of the human visual function. In order to determine the occurrence and extent of any such deterioration, it is desirable to provide on board the space vehicle suitable apparatus for testing the visual characteristics of the crew members.

In order to provide a fairly complete and comprehensive picture of the visual performance of the crew members, such vision testing apparatus should be capable of performing a relatively large number of different types of visual tests. For reasons of efficiency and in order to keep the work load to a minimum, the testing apparatus should be an integrated piece of equipment which is capable of being operated in as simple and as automatic a manner as is possible. Preferably, the apparatus should be capable of automatic control by a programmed computer. In view of the space limitations aboard space vehicles, such apparatus should also be as compact as possible.

Vision testing apparatus possessing the foregoing capabilities would also be useful in a number of civilian and industrial applications on earth. Such apparatus would be useful, for example, in public health clinics, schools, driver licensing bureaus, military induction centers, industrial health programs and other situations where large numbers of people are to have their vision tested. Such apparatus would also be useful in situations where trained test personnel are relatively unavailable, such as in remote communities and in developing countries.

SUMMARY OF THE INVENTION

It is an object of the invention, therefore, to provide new and improved vision testing apparatus of a compact and integrated character for performing a variety of different visual measurements on a human subject.

It is another object of the invention to provide new and improved vision testing apparatus which may be operated by relatively unskilled personnel.

It is a further object of the invention to provide new and improved multiparameter vision testing apparatus which may be readily controlled by a programmed computer.

In accordance with one feature of the invention, there is provided vision testing apparatus comprising chassis means, means carried by the chassis means for testing the visual acuity and ocular muscle balance of a human subject and means carried by the chassis means for mapping the visual field of the subject.

In accordance with another feature of the invention, there is provided vision testing apparatus which also includes means carried by the chassis means for determining the visual dark adaptation characteristics of the subject. In accordance with a further feature of the invention, there is provided vision testing apparatus which further includes Dolman rod means for testing the visual depth perception of the subject. In accordance with an additional feature of the invention, there is provided vision testing apparatus which additionally includes means for testing the visual critical fusion frequency and other visual characteristics of the subject.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 5 is an enlarged cross-sectional view taken along section line 5—5 of FIG. 2 and showing a front elevational view of a dark adaptation projector assembly and a portion of an inner box assembly located therebehind;

FIG. 6 is a partial side elevational view of the vision testing apparatus similar to the view of FIG. 2 but showing the more forwardly optical assemblies in their visual field mapping positions;

FIG. 7 is an enlarged front elevational view of the FIG. 6 visual field mapping assembly;

FIG. 8 is a cross-sectional view taken along section line 8—8 of FIG. 7 and showing a plan view of a portion of the visual field mapping assembly;

GENERAL DESCRIPTION OF THE OVERALL SYSTEM

Figure 1:
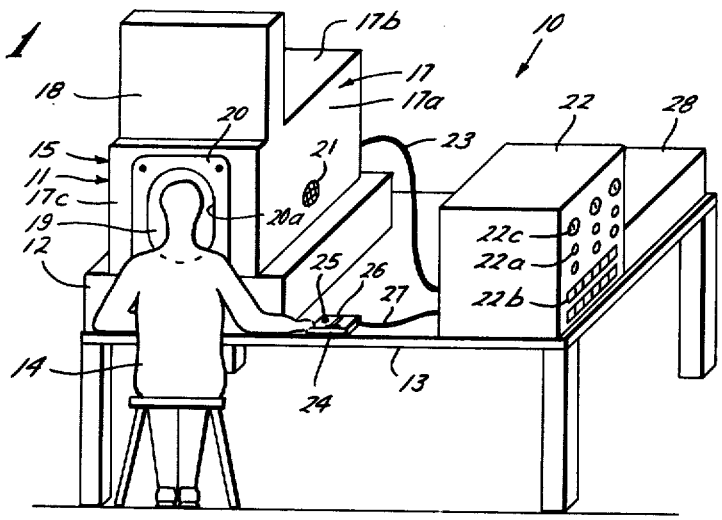
FIG. 1 is a perspective view showing a representative application of vision testing apparatus constructed in accordance with the present invention.
Figure 2:
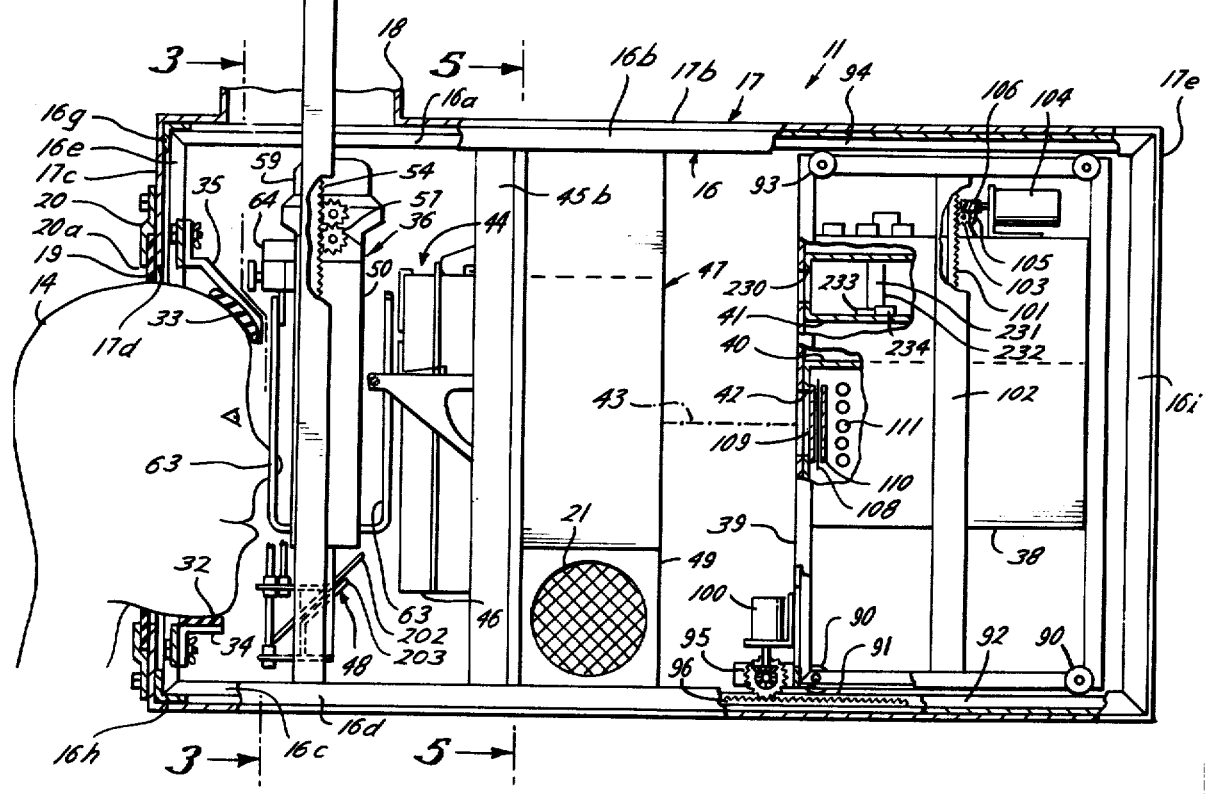
FIG. 2 is an enlarged side elevational view of the FIG. 1 vision testing apparatus with the side cover plate removed and with the optical assemblies positioned to perform various tests by means of a Phoroptor assembly and a film cassette unit providing various film targets for viewing purposes.

Referring to FIG. 1, there is shown one manner in which a representative embodiment of vision testing apparatus 10 constructed in accordance with the present invention may be used in a typical civilian or industrial application. Such vision testing apparatus 10 includes an optical unit 11 resting on a support base 12 which, in turn, is located on a table 13 before which sits the human subject 14 to be tested. The optical unit 11 includes a housing 15 formed by an inner box-like frame structure or chassis structure 16 (FIG. 2) having cover plates 17 secured to the various sides thereof. In FIG. 2, the right-hand cover plate 17a of FIG. 1 has been removed to show the various optical assemblies located within the housing 15.

As indicated in FIG. 2, the chassis structure 16 includes an upper pair of horizontal fore-and-aft running frame angles 16a and 16b and a lower pair of horizontal fore-and-aft running frame angles 16c and 16d. As indicated in the front cross-sectional view of FIG. 3, angles 16a and 16c are located on the left side and angles 16b and 16d are located on the right side of the chassis structure 16. The forward ends of frame angles 16a and 16c are interconnected by a left-hand vertical frame angle 16e, while the forward ends of frame angles 16b and 16d are interconnected by a right-hand vertical frame angle 16f (not shown in FIG. 2). Cross-running horizontal frame angles 16g and 16h interconnect the forward ends of the two side structures of the chassis structure 16. A similar construction is provided at the rearward end of the chassis structure 16, a rearward vertical frame angle interconnecting the rearward ends of frame angles 16b and 16d being indicated at 16i.

An upwardly-extending vertical extending compartment 18 is secured between the side-located upper frame angles 16a and 16b of the chassis structure 16. A top cover plate 17b secured between these same frame angles 16a and 16b completes the top cover of the housing 15. A front cover plate 17c having an enlarged port 17d (FIG. 2) in the central portion thereof is secured to the front of the chassis structure 16, port 17d being adapted to receive the forward portion of the head of the subject 14. Port 17d is surrounded by an inwardly-extending foam rubber head seal 19 which is held in place by a head seal plate 20 which is fastened to the front cover plate 17c, such head seal plate 20 having a center port 20a of substantially the same size as the port 17d. Head seal 19 bears against the head of the subject 14 in a resilient manner to provide a light-tight seal therewith. Except for the opening in the head seal 19, the housing 15 of the optical unit 11 is of a light-tight construction. The interior walls and members of the housing 15 are painted a dull black. The cover grille of a ventillation fan port is indicated at 21. The internal ventilation system (the details of which are not shown) is baffled so as not to impair the light-tight integrity of the housing 15. A rear cover plate 17e (FIG. 2) is secured to the rear of the chassis structure 16.

The optical unit 11 is connected to an electrical control unit 22 (FIG. 1) by way of a multiconductor electrical cable 23. The control unit 22 contains various switches, relays, potentiometers and electronic circuitry for controlling the operation of various motors and light sources located within the optical unit 11, various control knobs 22a and push buttons 22b therefor being located on the front panel of the control unit 22. Control unit 22 also includes various meters 22c for monitoring voltages received from various position-indicating potentiometers located in the optical unit 11. A hand unit 24 is located on the table 13 beside the optical unit 11 and within comfortable hand reach of the subject 14. Hand unit 24 includes a pushbutton switch 25 and a four-position toggle switch 26 for use in indicating the responses of the subject 14 to the various tests. The hand unit 24 is connected to the control unit 22 by way of a multiconducotr electrical cable 27. A multichannel signal recorder 28 is also provided for recording the responses of the subject 14 to the various tests, together with various identifying and operational data concerning the optical elements being used in the tests. Recorder 28 is connected to control unit 22 by an appropriate electrical cable (not shown).

As indicated in FIG. 2, the head of the subject 14 is positioned within the front or forward end of the chassis structure 16 by means of a chin rest 32 and a forehead rest 33 carried by adjustable support brackets 34 and 35, respectively.

Carried within the housing 15 are a number of different optical assemblies used in performing different ones of the visual tests. A first of these optical assemblies is a retractable Phoroptor assembly 36 which is supported near the front end 16e of the chassis structure 16 by an elevator mechanism for raising and lowering same, the lowered position being shown in FIG. 2. When in this lowered position, the forward side of the Phoroptor assembly 36 is immediately adjacent the eyes of the subject 14. When in its raised or retracted position, the Phoroptor assembly 36 is moved upwardly to a location above the upper chassis frame angles 16a and 16b, such location being shown in FIG. 6.

Located near the rear end 16i of the chassis structure 16 is an inner box assembly 38 which is carried by a movable carriage 39. Carriage 39 is adapted to undergo fore and aft movement. Also carried by the carriage 39 is an elevator mechanism for enabling a raising and lowering of the inner box assembly 38 within the carriage 39. Carried within the inner box assembly 38 are a film cassette unit 40 for providing visual targets for the Phoroptor assembly 36 and a Dolman rod unit 41 for use in testing the visual depth perception of the subject 41. FIG. 2 shows the position of the inner box assembly 38 wherein a viewing window 42 of the film cassette unit 40 is in line with an optical axis 43 representing the visual center line of the subject 14.

There is further included within the chassis structure 16 a visual field mapping assembly 44 supported by mechanisms located within the area encompassed by intermediate chassis frame members 45a–45d, only member 45b being visible in FIG. 2. The field mapping assembly 44 includes a retractable guide rail 46 which, when viewed from the front for the FIG. 2 position, is seen to have an arcuate or approximately semicircular shape. When in its retracted position as shown in FIG. 2, the guide rail 46 does not block the line of sight along the optical axis 43.

Carried within the chassis structure 16 rearwardly of the field mapping assembly 44 is a dark adaptation projector assembly 47 for use in performing certain dark adaptation and brightness threshold tests. When viewed from the front (as in FIG. 5), the assembly 47 is seen to be an inverted L-shaped structure such that it does not block the line of sight along the optical axis 43. Projector assembly 47 is used in conjunction with a retractable mirror assembly 48 which is carried by the Phoroptor assembly 36 with the mirrors thereof being located below the underside of such Phoroptor assembly 36.

A ventillation fan unit 49 is located below the projector assembly 47 on one side of the chassis structure 16, the cover grille on the fan exhaust port being indicated at 21.

DESCRIPTION OF PHOROPTOR AND FILM TARGET ASSEMBLIES

Various visual acuity and other refractive error tests and various ocular muscle balance tests are performed by means of the Phoroptor assembly 36 and the film cassette unit 40 located in the inner box assembly 38. For these tests, the various optical assemblies carried by the chassis structure 16 are in the positions shown in FIG. 2. In particular, the Phoroptor assembly 36 is in its down position, the inner box assembly 38 is in its up position, the field mapping assembly 14 is in its retracted position and the mirror assembly 48 is in its retracted and stowed position.

Figure 3:
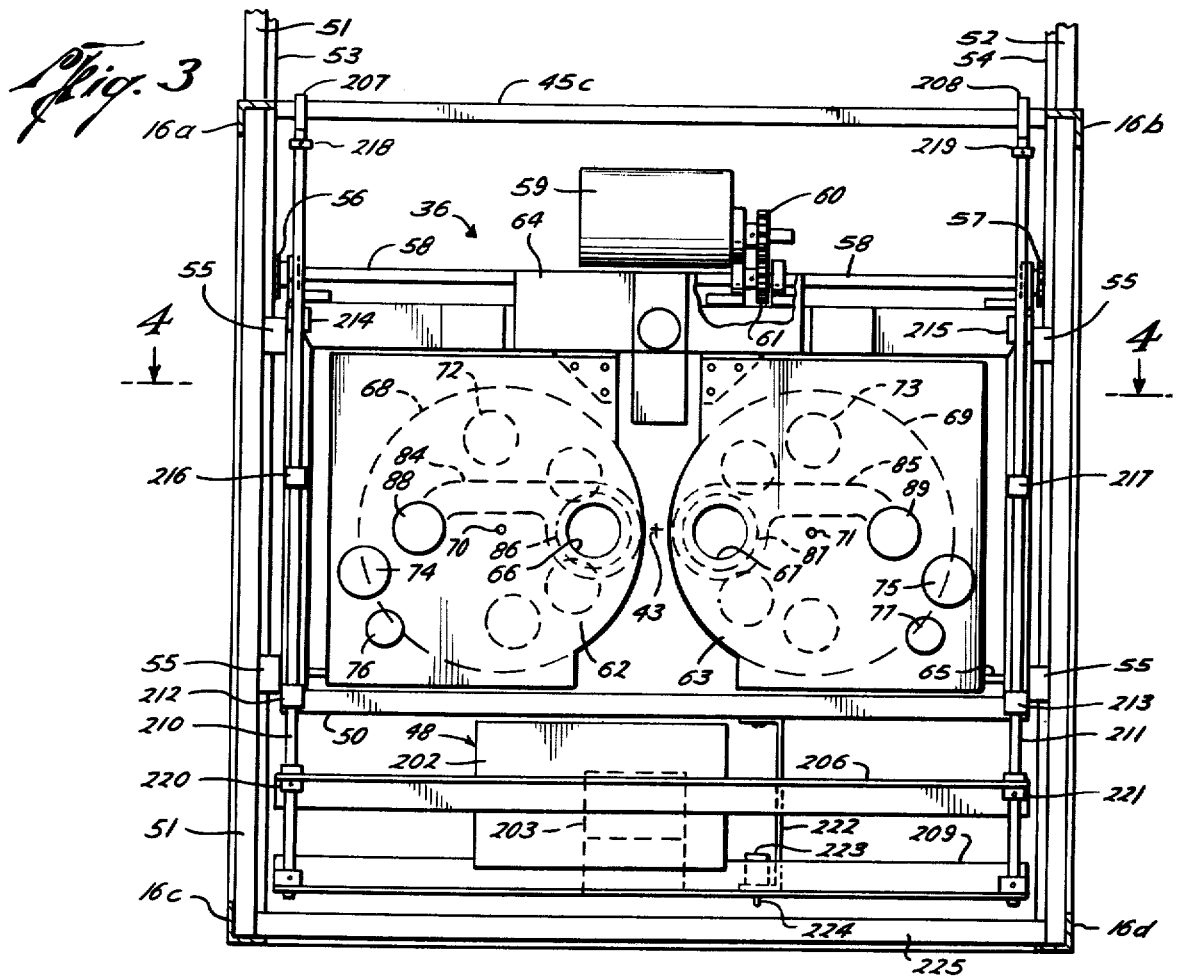
FIG. 3 is an enlarged cross-sectional view taken along section line 3—3 of FIG. 2 and showing a front elevational view of the Phoroptor assembly.
Figure 4:
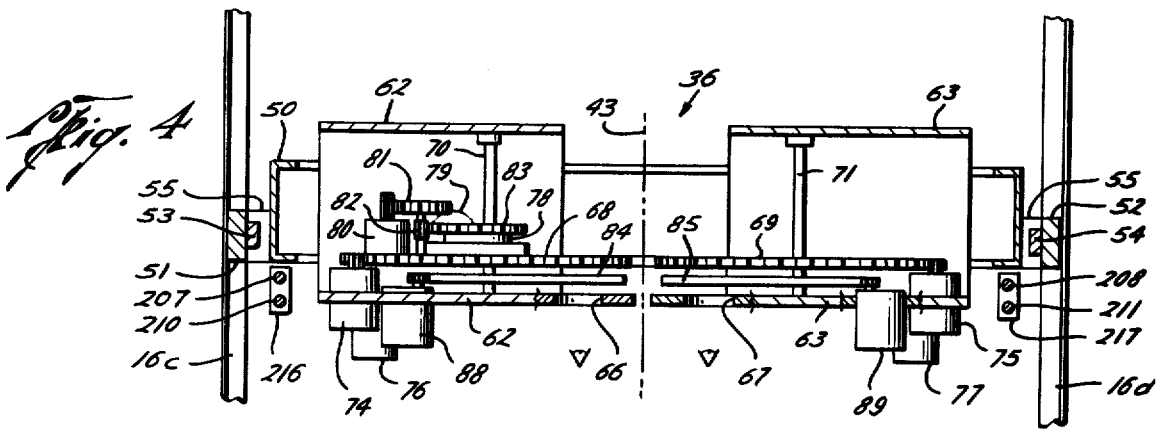
FIG. 4 is a cross-sectional view taken along section line 4—4 of FIG. 3 and showing a plan view of the optical portion of the Phoroptor assembly.

Referring to FIGS. 2–5, the details of the Phoroptor assembly 36 and the film cassette unit 40 will now be considered. Considering first the Phoroptor assembly 36, 23 a such assembly comprises a Phoroptor device and a support mechanism for movably supporting same. The support mechanism includes a rectangular frame-like carriage 50 and an elevator mechanism for raising and lowering same. Such elevator mechanism includes a pair of vertically-extending support members 51 and 52 located at opposite sides of the chassis structure 16 and secured thereto. These support members 51 and 52 extend a substantial distance above the upper frame angles 16a and 16b of the chassis structure 16. The Phoroptor elevator mechanism further includes an elongated toothed gear rack 53 secured to the inner side of the left-hand support member 51 and an elongated toothed gear rack 54 secured to the inner side of the right-hand support member 52, these racks 53 and 54 extending vertically nearly the entire length of the vertical support members 51 and 52. As indicated in FIG. 2, the gear teeth are located on the rearward facing sides of these racks 53 and 54. As indicated in FIGS. 3 and 4, two U-shaped nylon guides 55 are secured to each of the two sides of the Phoroptor carriage 50 and straddle their respective ones of the racks 53 and 54 for maintaining the carriage 50 in the proper vertical alignment while allowing a vertical sliding movement thereof. The toothed rearward sides of racks 53 and 54 are engaged by gears 56 and 57 mounted at opposite ends of a drive shaft 58 which is rotatably mounted on top of the carriage 50. Drive shaft 58 is driven by an electric motor 59 which is mounted on top of the carriage 50 and which is coupled to drive shaft 58 by way of gears 60 and 61, the latter being mounted on the drive shaft 58. Elevator motor 59 is of the reversible type and, when energized with electrical current, operates to either raise or lower the carriage 50, depending upon the direction of rotation of such motor 59. When motor 59 is de-energized, the friction of the gearing prevents movement of the carriage 50.

The Phoroptor device proper includes a pair of U-shaped housing members 62 and 63 which are secured to an overhead Phoroptor mount 64 which, in turn, is secured to the top piece of the carriage 50. The "U" shape of housing members 62 and 63 is seen when viewing same from the side, a side view of the member 63 being shown in FIG. 2. The bottom pieces of housing members 62 and 63 are slidably pinned to the carriage 50 by connecting pins 65. Housing members 62 and 63 are provided with viewing ports 66 and 67, respectively, which are in alignment with respective ones of the left and right eyes of the subject 14. These viewing ports 66 and 67 are located in the front legs of the U's and the back legs of the U's are cut back, as indicated in FIG. 4, so as not to extend across in back of the ports 66 and 67.

A pair of rotary support disks 68 and 69 are rotatably mounted within the U-shaped housing members 62 and 63, respectively, by means of rotary support shafts 70 and 71, respectively, which extend between and are journaled in the front and back legs of the U's. The left-hand rotary support disk 68 is provided with a series of angularly spaced ports 72 which are adapted to be rotated one at a time into position behind the left viewing port 66. The right-hand rotary support disk 69 is provided with a series of angularly spaced ports 73 which are adapted to be rotated one at a time into position behind the right viewing port 67. Gear teeth are formed on the edges of each of the rotary disks 68 and 69, such teeth extending completely around the circumference of each disk. An electric motor 74 mounted on and extending through the front leg of housing member 62 has mounted on the rearwardly extending drive shaft thereof a pinion gear which engages the gear teeth on the edge of disk 68. Similarly, an electric motor 75 mounted on and extending through the front leg of the right-hand housing member 63 has mounted on the rearwardly extending drive shaft thereof a pinion gear which engages the teeth on the periphery of the right-hand disk 69. Position-indicating potentiometers 76 and 77 are mounted on and extend through the front legs of housing member 62 and 63, respectively, and are each provided with gears mounted on their rearwardly extending drive shafts for engaging the gear teeth on the perimeters of the respective disks 68 and 69. The signals provided by potentiometers 76 and 77 indicate which of the individual rotary disk ports 72 and 73 are in alignment with the viewing ports 66 and 67. Disk 68 is rotated by energizing motor 74, while disk 69 is rotated by energizing motor 75. For automatic control purposes, motor 74 may take the form of a servo motor which is connected into a servo loop with the potentiometer 76. In such case, the supplying of an appropriate command voltage to the input of the servo loop will cause the motor 74 to automatically advance the rotary disk 68 to the appropriate position. Similarly, motor 75 would be a servo motor connected into a servo loop with the potentiometer 77.

Various different optical elements and devices are mounted on and carried by each of the rotary support disks 68 and 69, each such element or device being positioned in alignment with one of the rotary disk ports 72 and 73. The left-hand rotary disk 68, for example, carries a horizontal Maddox rod device, a vertical Maddox rod device and a horizontal Risley prism device, each positioned at a different one of the ports 72, a further one of the ports 72 being left open and an additional one of the ports 72 being closed to provide a shutter or occluder. The right-hand rotary disk 69, on the other hand, may be provided with, for example, a vertical Risley prism device and a horizontal Risley prism device located at different ones of the ports 73, another of the ports 73 being left open and a further of such ports 73 being closed to provide a shutter or occluder position. An additional one of the ports 73 is closed except for a small pinhole aperture in the center thereof.

As is known, a Risley prism device is comprised of two prisms which are mounted in concentric rings, one in front of the other, and having a drive mechanism whereby the rings may be rotated in opposite directions for purposes of varying the angle of deviation of light rays passing through the two prisms. As is also known, a Maddox rod device is a lens type affair comprised of a group of parallel glass rods that serve to transform a spot of light into a broken line of light.

For simplicity of illustration, only one of the Risley prisms, namely, the one carried by the left-hand disk 68 is shown in the drawings, this Risley prism being indicated at 78 in FIG. 4. An electric motor for driving the deviation-adjusting mechanism is mounted on the back side of the disk 68 and is partially visible at 79 in FIG. 4. A position-indicating potentiometer 80 is mounted on the back side of disk 68 and the gear shaft thereof is coupled to the rotary ring of Risley prism 78 by way of gears 81, 82 and 83, the latter being secured to the rotary ring of the Risley prism 78. Though not shown, it is understood that the two Risley prism devices carried by the right-hand disk 69 are similarly provided with individual driving motors and adjustment-monitoring potentiometers.

As indicated in FIG. 3, the U-shaped housing members 62 and 63 further carry lens holders 84 and 85, respectively, which are pivotally coupled at their outer ends to the front legs of their respective housing members. Lens holder 84 carries a collimating lens 86, while lens holder 85 carries a collimating lens 87. Electric motors 88 and 89 mounted on and extending through the front legs of housing members 62 and 63, respectively, are geared to the pivot shafts of the lens holders 84 and 85, respectively, for purposes of causing a pivotal movement of such lens holders when such motors are energized. Motors 88 and 89 thus serve to individually and selectively position the collimating lenses 86 and 87 in alignment with the viewing ports 66 and 67 or to retract or pivot them out of way, depending on the particular test being performed. Appropriate limit switches (not shown) are mounted on the rear sides of the front legs of housing members 62 and 63 for determining the in place and retracted positions of the lens holders 84 and 85.

With reference to FIGS. 2 and 5, the details of the target supporting inner box assembly 38 and the target displaying film cassette unit 40 carried therein will now be considered. As indicated in FIG. 2, the inner box carriage 39 is provided with lower sets of grooved wheels 90 which ride on left and right side rails 91 and 92. Side rails 91 and 92 are attached to the horizontal flanges of the bottom angles 16c and 16d, respectively, of the chassis structure 16, side rail 91 being shown in a cross-sectional manner in FIG. 5. The carriage 39 further includes upper sets of grooved wheels 93 which ride on side rails attached to the top angles of the chassis structure 16, the right-hand such side rail being indicated at 94 in FIG. 2. Fore and aft movement of the carriage 39 is controlled by a motor-driven gear wheel 95 which meshes with the teeth in an elongated gear rack 96 secured to the bottom of the chassis structure 16. The shaft 97 (FIG. 5) of gear wheel 95 is rotatably mounted on the forward side of the carriage 39 and is driven by a pair of bevel gears 98 and 99, the former being mounted on the shaft 97 and the latter being mounted on the drive shaft of an electric motor 100. As indicated in FIG. 5, the gear wheel 95, rack 96 and motor 100 are centrally located at the forward end of the carriage 39. Proper activation of the motor 100 allows movement of the carriage 39 in the forward direction up to the point where it comes into contact with the rearward side of the projector assembly 47.

As indicated in FIG. 2, the elevator mechanism for the inner box assembly 38 includes a pair of side-located vertically-extending gear racks, of which only the right-hand rack 101 is visible in FIG. 2. Gear rack 101 is secured to the inner side of a vertically-extending support member 102 which is attached to and run between the top and bottom frame members of the carriage 39. A gear 103 located at the end of a drive shaft rotatably mounted on the top of the box assembly 38 engages the teeth of the rack 101. This drive shaft, which extends into the plane of the paper in FIG. 2, is coupled to an electric motor 104 by means of gear 105 and worm gear 106, the former being mounted on the drive shaft and the latter being mounted on the shaft of the motor 104. The elevator motor 104 is mounted on top of the inner box assembly 38. The corresponding vertically-extending gear rack (not shown) at the opposite side of the carriage 39 is engaged by a second gear mounted on the opposite end of the same drive shaft as is the gear 103. Motor 104 is of the reversible type and the inner box assembly 38 is raised or lowered by energizing such motor 104 with the proper polarity electric current. The friction of the various gears prevent movement of the inner box assembly 38 when motor 104 is not being energized.

The film cassette unit 40 located within the inner box assembly 38 includes a film transport mechanism (not shown) for selectively moving successive frames on a relatively long length of photographic film 108 into viewing position behind the target viewing or target display window 42. In moving across the viewing window 42, the photographic film 108 passes between a clear glass plate 109 and a plate of opal glass 110 closely spaced therebehind, the former being mounted on the back side of the viewing window 42. A distributed light source 111 is located in back of the rearward glass plate 110 for backlighting the film frame in the window position. Each frame on the photographic film 108 is of substantially the same size as the viewing window 42 and each frame contains a different test pattern or visual target which, when in position in window 42, is viewed by the human subject 14 by looking into the viewing ports 66 and 67 of the Phoroptor assembly 36. By way of example only, the photographic film 108 may include somewhere on the order of 100 frames.

The film transport mechanism for advancing the photographic film 108 is driven by an electric motor (not shown) having a shaft encoder (not shown) coupled to the drive shaft thereof, these elements being located within the film cassette unit 40. The shaft encoder provides identification signals which identify which of the different film frames is in viewing position behind the viewing window 42. For automatic control purposes, an electronic comparator circuit is included within the control unit 22 (FIG. 1) for purposes of comparing the shaft encoder signals with a command signal which identifies the particular film frame to be selected. When the shaft encoder signal matches the command signal, a relay connected to the output of the comparator circuit operates to discontinue the supplying of energizing voltage to the driving motor of the film transport mechanism. This stops the film 108 with the desired frame in front of the viewing window 42. The appropriate command signal is selected by proper manipulation of the controls on the front panel of the control unit 22.

Referring to FIG. 5, there is shown a first removable stereo separator plate 112 which is used during some of the Phoroptor and film target tests during which the inner box carriage 39 is in the aft position shown in FIG. 2. The stereo separator plate 112 is constructed of opaque material and, when in place, extends fore and aft from near the rearward end of the Phoroptor assembly 36 to the forward end of the inner box assembly 38. A middle portion of the plate 112 is provided with an upper laterally-extending flange 113 which is adapted to be received in a C-shaped support member 114 which is supported below the projector assembly 47 by means of a bracket frame 115 which is attached to the underside of the projector assembly 47. A second and shorter length removable stereo separator plate is used for some of the tests during which the inner box carriage 39 is in its forward position immediately adjacent the projector assembly 47. Except for the difference in fore-to-aft length, this second stereo separator plate is of the same construction as the first plate 112. As indicated in FIG. 5, these stereo separator plates are used to provide an optical partition whereby the left eye of the subject 14 can see only the left half of the target display window 42 and the right eye of the subject 14 can see only the right half of the target display window 42. In the present embodiment, the stereo separator plates are inserted and removed from the optical unit 11 in a manual manner.

OPERATION OF PHOROPTOR AND FILM TARGET ASSEMBLIES

Considering now the use of the Phoroptor assembly 36 and the film cassette unit 40, it is initially noted that various ones of the tests are performed for both near image and far image distances. For sake of an example, it will be assumed that the near image tests are made at an eye to film target distance of eighteen inches, while the far image tests are made with the film targets at apparent infinity. For the near image tests, the film cassette support carriage 39 is moved to its forwardmost position (toward the left in FIG. 2) such that the forward side of the carriage 39 is closely adjacent the rearward side of the projector assembly 47. This is accomplished by the activation of the carriage motor 100, such motor 100 being automatically deactivated by an appropriate limit switch (not shown) when the carriage 39 reaches the desired forwardmost position. For the far image tests, the film cassette support carriage 39 is moved to its rearwardmost position, this being the one shown in FIG. 2. As before, an appropriate limit switch (not shown) automatically de-energizes the carriage motor 100 when the desired rearward position is reached.

A further adjustment for shifting from the near image to the far image distance or vice versa concerns the collimating lenses 86 and 87 carried by the Phoroptor housing members 62 and 63. For the near image tests, the collimating lenses 86 and 87 are rotated upwardly so as to be removed from behind the Phoroptor eye ports 66 and 67. Conversely, for the far image tests, the collimating lenses 86 and 87 are returned to the positions indicated in FIG. 3 wherein they are in place behind the viewing ports 66 and 67. Movement of the collimating lenses 86 and 87 is provided by activation of motors 88 and 89, appropriate limit switches (not shown) being used to stop the movement when the lens holders 84 and 85 reach their "in" and "out" positions. The fore and aft movement of the film cassette support carriage 39 serves to accommodate the different focal lengths which exist depending on whether or not the collimating lenses 86 and 87 are being used.

Another item which is used in some but not other of the tests is the stereo separator plate 112 (FIG. 5) which restricts the left eye to the left half and the right eye to the right half of the target display window 42. In the present embodiment, the stereo separator plate 112 (or its shorter replacement) is inserted and removed in a manual manner. This is accomplished by raising the Phoroptor assembly 36 to its uppermost position above the chassis frame angles 16a and 16b. The operator conducting the tests then reaches in through the opening in the head seal 19 and into the interior of the chassis structure 16 and manually removes or replaces the stereo separator plate 112 by either removing or replacing its flange 113 in the C-shaped support member 114. After the stereo separator plate 112 is removed or replaced, the Phoroptor assembly 36 is returned to the lowered position shown in FIG. 2.

Before the tests are commenced, the chin rest 32 and forehead rest 33 are adjusted to properly position the head of the subject 14. Before making these adjustments, the film cassette support carriage 39 is moved to the "far image" or rearward position and the collimating lenses 86 and 87 are moved to their "in place" positions behind the Phoroptor viewing ports 66 and 67. The left hand rotary support disk 68 of Phoroptor 36 is moved to the open position and the right hand rotary support disk 69 is moved to its pin hole position. These movements are accomplished by energizing motors 74 and 75, the disk positions being monitored by means of the position signals developed by potentiometers 76 and 77. The film transport mechanism in the film cassette unit 40 is operated to position in the film target window 42 a visual target having a readily recognizable pattern such as, for example, a group of numbers or letters. The subject 14 then places his chin on the chin rest 32 and his forehead against the forehead rest 33 and determines whether the fit is comfortable and whether he can properly see the film target in the target window 42. If either or both of these conditions are not met, then the chin rest 32 and head rest 33 are adjusted as necessary to obtain these conditions. This completes the preliminary adjustments for the Phoroptor and film target tests.

The various positioning motors associated with both the Phoroptor assembly 36 and the film cassette supporting inner box assembly 38, as well as the film transport mechanism in film cassette unit 40, are controlled by proper manipulation of the control knobs and pushbuttons on the front panel of the control unit 22 by the operator conducting the tests. The positions of the various assemblies and elements are indicated on the front panel of control unit 22 by the various meters and appropriate signal lights located on such front panel.

The Phoroptor assembly 36 and film cassette unit 40 are used to perform a number of different types of tests relating to visual acuity, astigmatism, ocular muscle balance, visual depth perception and the like. For example, these assemblies may be used to perform the following tests:

1. Separable acuity
2. Vernier acuity
3. Phoria—Maddox rod
4. Phoria—stereoscope
5. Phoria—dissociation
6. Stereopsis—Eikonometer
6. Duction
8. Astigmatism This listing is intended by way of example only because these assemblies may be readily modified to accomplish further and additional tests. For example, various spherical and cylindrical lenses may be added to the rotary Phoroptor disks 68 and 69 for refractive status determination, amplitude of accommodation, relative accommodation and accommodative-convergence association tests. By adding appropriate additional film targets, the Maddox rod and Risley prism devices may be used to perform cyclophoria tests.

Visual acuity relates to the resolving power of the eye or the ability of the eye to see fine detail. Separable acuity is measured by performing an eye chart type of test. In the present embodiment, Landolt rings are used for this purpose. As is known, a Landolt ring is a circle having a small break on one side thereof and the subject is required to identify the side (right, left, top or bottom) on which the break is located. For the near distance separable acuity tests, one Landolt ring is recorded on each of a number of different ones of the film target frames in the film cassette unit 40. A set of four such frames is used for each of several different acuity values ranging from, for example, 20/10 to 20/50, the four frames in each set having the ring breaks in the up, down, left and right positions, respectively. Thus, the operator can select a goodly number of different size Landolt rings and, for any given size, can select frames wherein the ring break is in any one of the four different directions. A similar series of Landolt ring frames are also provided for the far distance separable acuity tests with the exception that for each frame there will be recorded thereon two identical Landolt rings, one for the left half of the target window 42 and the other for the right half of the target window 42. Two rings are required because the stereo separator plate 112 is used in connection with the far distance tests.

For the vernier acuity tests, there are recorded on each of several different film target frames a pair of vertical line segments or bars, the adjacent ends of which touch one another but the vertical center lines of which are offset from one another by differing amounts varying from zero up to a maximum of, for example, a distance corresponding to 40 seconds of arc. Separate series of vernier acuity targets are provided for the near and far distance tests with double targets again being provided for the far tests.

Separable acuity and vernier acuity measurements are performed for both the far and near image distances. For each of the four cases (separable acuity far and near and vernier acuity far and near), tests are performed for the left eye alone, the right eye alone and both eyes together.

A typical sequence for performing the acuity tests will now be considered. In this example, all of the various far distance tests are first performed, after which all of the various near distance tests are performed. In order to set the apparatus up for the far tests, the operator conducting the tests first operates the control unit 22 (FIG. 1), if necessary, to move the film cassette support carriage 19 to the far or rearwardmost position (as shown in FIG. 2). The operator then raises the Phoroptor assembly 36, inserts the flange 113 of the stereo separator plate 112 into the C-shaped support member 114 and pushes the plate 112 against the front side of the film target window 42. The Phoroptor assembly 36 is then returned to its lower position (as shown in FIG. 2) and the operator operates the control unit 22 to move the collimating lenses 86 and 87 to their "in place" positions behind the Phoroptor viewing ports 66 and 67. At this point, the subject 14 is instructed to again place his head within the opening in the head seal 19 so that his chin is on the chin rest 32 and his forehead is against the forehead rest 33.

Assuming that the first series of tests are to be performed on the left eye alone, the left rotary support disk 68 in the Phoroptor assembly 36 is moved to its open position and the right rotary support disk 69 is moved to its shutter or occluder position. A selection of different separable acuity (Landolt ring) film frames are then presented one at a time in the target window 42 and the subject 14 is instructed to indicate for each frame in which direction lies the break in the ring. The subject's response is indicated and recorded by proper manipulation of the four-position toggle switch 26 on the hand unit 24. After the completion of the separable acuity tests, the subject 14 is instructed to push the mark button 25, signifying completion of this part of the test. Different ones of the vernier acuity film frames are then presented one at a time to the subject 14. The subject again indicates his response by manipulation of the toggle switch 26, the switch being moved in one direction if the image pattern appears to be a broken line and moved in another direction if the image pattern appears to be a single solid line. Following this, the subject 14 again depresses the mark button 25. This completes the left eye far distance tests. The various film targets presented to the subject 14 for these tests may be selected in either a random or a deliberate manner from the relatively large number of different targets available for these tests. The desired film frames are selected by the operator by pressing the appropriate numerical selector push-buttons on the front panel of the control unit 22. An identifying code for each target frame, as well as the subject's response thereto, are recorded by the recorder 28 for later analysis.

A similar series of tests are performed for the right eye along except that, in this case, the left rotary Phoroptor disk 68 is set to the shutter position and the right rotary Phoroptor disk 69 is set to the open position. A desired selection of separable and verneir acuity target frames are then programmed and the subject's response thereto recorded in the same manner as before.

For the far distance acuity tests using both eyes together, the left rotary Phoroptor disk 68 is moved to the horizontal Risley prism position and the right rotary Phoroptor disk 69 is set to the open position. The line of sight deviation produced by the left horizontal Risley prism device 78 is then adjusted in accordance with the interpupullary spacing of the subject 14 to position the image seen by the left eye in a direct line with the left eye when the left eye is looking straight ahead. The correct input drive voltage for the Risley prism servo system is obtained by measuring the subject's interpupillary spacing and then referring to a previously prepared calibration chart relating servo input voltages to image positions. A desired selection of separable and vernier acuity far distance film frames are then selected in a sequential manner and the subject's response thereto recorded in the same manner as before. This completes the far distance tests.

Considering now the near distance acuity tests, the stereo separator plate 112 (FIG. 5) is removed from the optical unit 11, the film cassette support carriage 39 is moved to its near distance or forward position and the collimating lenses 86 and 87 are moved to their retracted positions so that they are no longer behind the viewing ports 66 and 67. The left eye near tests, right eye near tests and both eye near tests are performed in the same manner as for the far tests, with the exception that the left horizontal Risley prism device is not used for the near test with both eyes. Instead, both rotary Phoroptor disks 68 and 69 are set to their open positions. Also, near distance film frames are used for the near distance tests.

The foregoing sequence of tests just considered in by way of example only. Alternative sequences can instead be used and the particular number of film frames used for any given test condition (e.g., left eye far distance condition) can be varied to suit the particular requirements of the application for which the tests are being preformed. Also, where desired, the visual acuity film frames can be modified to provide multiple targets on each film frame.

Considering now the phoria tests, it is helpful to note that "phoria" is the latent tendency of the eyes to deviate from their normal positions for binocular vision. Another way of defining phoria is to first define the term "fusion". Fusion is the power exerted by both eyes to keep the positions of the eyes aligned so that both foveae (most sensitive retinal regions) project to the same point in space. Phoria can then be defined as the position the eyes assume when fusion is disrupted. A rudimentary way of measuring phoria is to cover one of the eyes and then to observe the deviation of the covered eye from its former position.

Four different Maddox rod phoria tests are performed, namely, a far distance horizontal phoria test, a far distance vertical phoria test, a near distance horizontal phoria test and a near distance vertical phoria test. For the far distance tests, the film cassette support carriage 39 is moved to the rearward position, the stereo separator plate 112 is set in place, the collimating lenses 86 and 87 are set in place behind viewing ports 66 and 67 and the film transport mechanism in the film cassette unit 40 is advanced so as to display a film frame having two small dots, one in the center of the left eye viewing area and the other in the center of the right eye viewing area of the film target window 42. Normally, these two dots should appear as a single dot to the subject 14. In order to test horizontal phoria, the left rotary Phoroptor disk 68 is set to place the vertical Maddox rod device in line with the left viewing port 66 and the right rotary Phoroptor disk 69 is set to place the horizontal Risley prism device in line with the right Phoroptor viewing port 67. The right horizontal Risley prism device is then adjusted in accordance with the interpupillary spacing of the subject 14.

The left vertical Maddox rod device before the left eye of the subject 14 serves to transform the small dot on the left side of the film frame into a broken vertical line. Thus, the left eye sees a vertical line, while the right eye sees a small dot. Since these images cannot be fused, the eyes assume their fusion-free positions. If any phoria exists, the vertical line will appear to be located to one side or the other of the small dot. The operator then connects the toggle switch 26 so as to enable it to control the deviation adjustment motor for the right horizontal Risley prism device. This is accomplished by an appropriate switch setting on the front panel of the control unit 22. Thereafter, the subject 14 is instructed to control the positions of the images by a left or right movement of the toggle switch 26 until the vertical line appears to lie on top of the small dot. The subject 14 then depresses the mark button 25 which causes a recording of the signal then being provided by the deviation monitoring potentiometer coupled to the right horizontal Risley prism device.

For the far distance vertical phoria test, the left rotary Phoroptor disk 68 is set to the horizontal Maddox rod position and the right rotary Phoroptor disk 69 is set to the vertical Risley prism position. The left horizontal Maddox rod device transforms the small dot otherwise seen by the left eye into a broken horizontal line. The vertical Risley prism device before the right eye is then connected to the toggle switch 26 and the subject is instructed to control same with a fore and aft movement until the horizontal line and small dot appear to be superimposed. At this point, the subject 14 depresses the mark button 25 and the right vertical Risley prism deviation signal is recorded by the recorder 28.

The near distance horizontal and vertical Maddox rod phoria tests are performed in the same manner as the corresponding ones of the far distance tests with the exception that the stereo separator plate 112 is removed, the collimating lenses 86 and 87 are retracted, the support carriage 39 is moved to its forward position and the film transport mechanism is activated to display a single small dot in the middle of the film target window 42.

Considering now the stereoscope phoria tests, such tests include both horizontal and vertical far distance tests and horizontal and vertical near distance tests. A stereo separator plate (e.g., plate 112) is used for all of these tests. The collimating lenses and the rearward film cassette support carriage position are used for the far tests, while the collimating lenses are retracted and the forward support carriage position is used for the near tests. For the horizontal tests, both the left and right rotary Phoroptor disks 68 and 69 are set to their horizontal Risley prism positions. The same film target frame is used for both horizontal tests, the target pattern on such frame comprising a vertical line for viewing by the left eye and a broken horizontal line having a small gap in the middle thereof for viewing by the right eye. For the horizontal far test, the left horizontal Risley prism is adjusted to provide the interpupillary compensation for the subject 14. The adjustment motor for the right horizontal Risley prism is connected to the toggle switch 26 and the subject 14 is instructed to adjust the toggle switch 26 with a left or right motion until the vertical line fills in the gap in the broken horizontal line. The mark button 25 is then depressed and the right horizontal Risley prism deviation signal is recorded. The horizontal near distance test is conducted in the same manner except that an additional 6.0 diopter inward correction is added to the initial interpupillary adjustment for the left horizontal Risley prism.

For both vertical stereoscope phoria tests, the left rotary Phoroptor disk 68 is set to the horizontal Risley prism position and the right rotary Phoroptor disk 69 is set to the vertical Risley prism position. The film transport mechanism is advanced to place the desired vertical target pattern in the film target window 42. This pattern comprises a vertical line having a small center gap for viewing by the left eye and a solid horizontal line for viewing by the right eye. For both the far and near vertical tests, the adjustment motor for the right vertical Risley prism is connected to the toggle switch 26 and the subject is instructed to adjust the positions of the vertical and horizontal lines with a fore and aft movement of the toggle switch 26 until the solid horizontal line is located in the gap in the broken vertical line. The mark button 25 is then depressed to record the right vertical Risley prism deviation signal.

Considering now the dissociation phoria tests, such tests are performed for horizontal phoria at both far and near distances. The stereo separator plate 112 and the collimating lenses 86 and 87 are used for the far test, but not the near test, the film cassette support carriage 39 being rearward for the far test and forward for the near test. The film target pattern used for these tests is a capital letter E, a double image target being used for the far test and a single image target being used for the near test. For both the far and near tests, the left rotary Phoroptor disk 68 is set to the horizontal Risley prism position and the right rotary Phoroptor disk 69 is set to the vertical Risley prism position. The right vertical Risley prism is then adjusted to provide an upward 6.0 diopter image shift. Thereafter, the left horizontal Risley prism adjustment motor 79 is connected to the toggle switch 26. The subject 14 is then instructed to control the images by a left or right movement of the toggle switch 26. This produces a horizontal movement of the image seen by the left eye. The subject 14 is instructed to continue such movement until the images seen by the two eyes are brought into vertical alignment with one another. The subject 14 then depresses the mark button 25 and records the left horizontal Risley prism deviation signal.

The Eikonometer stereopsis test is a type of depth perception test. The tests are conducted at the far image distance (collimating lenses in and film cassette carriage back) and the stereo separator plate 112 is used. The left rotary Phoroptor disk 68 is set to the horizontal Risley prism position and the right rotary Phoroptor disk 69 is set to the open position. The left horizontal Risley prism adjustment motor is then adjusted in accordance with the subject's interpupillary compensation factor. A set of three different film target frames are then presented, one at a time, to the subject 14, each such film frame having an Eikonometer type target thereon. Each such target includes individual left eye and right eye images with each such image comprising a pair of vertical lines spaced apart by an X of approximately the same vertical extent. For one film frame, the vertical line on the left in the resulting single image seen by both eyes should appear to be closer to the observer. For another film frame, the vertical line on the right should appear to be closer. For the third film frame both vertical lines should appear to be at the same distance. These film frames are presented to the subject 14 in any desired sequence and the subject is instructed to move the toggle switch 26 to the left if the left side appears to be closer, to the right if the right side appears to be closer and in an upwardly or aft direction if both vertical lines appear to be at the same distance. After movement of the toggle switch 26 for any given film frame, the subject depresses the mark button 25 to record his choice for such frame. The Eikonometer film frames may be presented to the subject 14 in any desired order and any desired number of times.

Considering now the duction tests, the term "duction" relates to the turning or rotational characteristics of an eyeball. The particular duction tests considered herein serve to measure the range of fusion for the eyes of the subject 14. Four tests are performed, namely, outward duction at a far image distance, inward duction at a far image distance, outward duction at a near image distance and inward duction at a near image distance. For the far tests, the collimating lenses 86 and 87 are in and the carriage 39 is back, while for the near tests the collimating lenses 86 and 87 are out and the carriage 39 is forward. A stereo separator plate is not used in any of the tests. A typical frame target image that may be used may show, for example, the image of a tree with some words of test printed under it. Two different film frames are used to provide the appropriate image sizes for the two different test distances. For all tests, both the left and right rotary Phoroptor disks 68 and 69 are set to their horizontal Risley prism positions.

For the far distance outward duction test, the left horizontal Risley prism is initially adjusted to provide an outward 14 diopter shift of the image seen by the left eye and the right horizontal Risley prism is initially adjusted to provide an inward 12 diopter shift for the image seen by the right eye. Following these initial adjustments, the right horizontal Risley prism adjustment motor is connected to the toggle switch 26. The subject 14 is then instructed to move the toggle switch 26 in a direction so as to shift the image seen by the right eye in an outwardly direction. The subject 14 is instructed to depress the mark button 25 when the image first begins to blur and again when the image breaks into two images. This records the right Risley prism adjustment signals for these two occurrences.

For the far distance inward duction test, the left horizontal Risley prism is initially adjusted to provide an inward 12 diopter shift of the image seen by the left eye and the right horizontal Risley prism is initially adjusted to provide an outward 12 diopter shift of the image seen by the right eye. The right horizontal Risley prism adjustment motor is then connected to the toggle switch 26. The subject 14 is instructed to move the toggle switch 26 in a direction to shift the right image in an inwardly direction and to depress the mark button 25 when the image blurs and then again when the image breaks into two images. This records the right Risley prism adjustment signals for these conditions.

The near distance outward and inward tests are performed in the same manner as the corresponding ones of the far distance tests.

Astigmatism tests are performed at far and near distances for the left eye along and at far and near distances for the right eye alone. The film target image takes the form of a modified astigmatism clock pattern, a single image being used for the near tests and a double image being used for the far tests. Each image is comprised of a set of four lines radiating radially from a common center area and angularly spaced by an angle of 45°. Thus, these lines can be said to be at 0°, 45°, 90°, and 135° positions. The collimating lenses 86 and 87 and the rearward position for carriage 39 are used for the far distance tests but not for the near distance tests. The stereo separator plate 112 is used for the far distance tests but not the near distance tests. For the left eye tests, the left rotary Phoroptor disk 68 is set at the open position and the right rotary Phoroptor disk 69 is set at the shutter position. Conversely, for the right eye tests, the left disk 68 is set at the shutter position and the right disk 69 is set at the open position. For each test, the subject 14 is instructed to indicate which of the four target lines appears most clear by moving the toggle switch 26 to a particular one of its four positions, the different positions being used to designate different ones of the target lines. After movement of the toggle switch 26 to the selected position, the mark button 25 is depressed to record the selection.

VISUAL FIELD MAPPING ASSEMBLY

Referring now to FIGS. 6, 7 and 8, the details of the visual field mapping assembly 44 will now be considered. FIG. 6 shows a side view of the field mapping assembly 44 with the arcuate guide rail 46 in one of its several different extended or test positions. During the field mapping tests, the Phoroptor assembly 36 is in its retracted or elevated position above the upper chassis frame angle 16b and the mirror assembly 48 is in its stowed position immediately below the Phoroptor assembly 36, these being the positions shown in FIG. 6. As indicated in FIG. 7, the frame members 45a–45d associated with the field mapping assembly 44 are secured between different pairs of the horizontal fore-and-aft running chassis frame members 16a–16d. As indicated in FIG. 8, these frame members 45a–45d are in the form of channels having inwardly extending flanges which, as will be seen, are used for guide purposes.

The field mapping assembly 44 includes ring means, represented by a meridian ring 120, having an inside diameter substantially greater than the width of an ordinary adult human head. Such inside diameter may be, for example, on the order of 16 or 17 inches. The field mapping assembly 44 further includes bearing means carried by the chassis structure 16 for vertically supporting the meridian ring 120 and for enabling rotation of the meridian ring 120 around its center axis. This bearing means comprises a set of four double-flanged rollers 121, each of which is rotatably mounted at the forked inward end of a support post 122, the outward end of each support post 122 being secured to one of the chassis frame angles 16a–16d. As such, the meridian ring 120 is rotatably mounted within the confines of the framing structure formed by the frame members 45a–45d. As seen from FIG. 8, the inwardly extending flanges of these frame members 45a–45d act as guides for the left, right, top and bottom arcuate extremities of the ring 120. An electric motor 123 is mounted on the chassis structure 16 and the drive shaft thereof is coupled to the shaft of the lower left-hand meridian ring roller 121. Activation of the motor 123 causes rotation of this roller 121 which, in turn, causes rotation of the meridian ring 120 around its center axis.

As indicated in the plan view of FIG. 8, the arcuate or semicircular guide rail 46 is adapted to partially encircle the head of the subject 14 when such guide rail 46 is in its extended position. The angle subtended by the arcuate curvature of the guide rail 46 is somewhat greater than 180° but substantially less than 360°. In the FIG. 8 embodiment, the subtended angle is on the order of 210° to 220°. As best seen in FIG. 7, the guide rail 46 includes a cylinder body portion 46a and a radially extending flange portion 46b which extends radially outward from the center of the body portion 46a. As such, the guide rail 46 has a T-shaped cross section.

The field mapping assembly 44 further includes means for pivotally coupling the guide rail 46 to the meridian ring 120 for providing a test position wherein the guide rail 46 extends forwardly of the meridian ring 120 and at right angles to the principal diametrical plane thereof and for providing a stowed position wherein the guide rail 46 is vertically disposed adjacent the meridian ring 120 so as to encircle the path of the lines of sight running from the eyes of the subject 14 to the target display window 42 of the film cassette unit 40. This pivotal coupling means includes a pair of forwardly extending support brackets 124 and 125, the rearward ends of which are secured to the meridian ring 120 on opposite sides thereof. A side view of the right-hand support bracket 125 is shown in FIG. 6. These support brackets 124 and 125 cooperate with pivot posts 126 and 127 which are secured to the flange portion 46b of the guide rail 46 on opposite sides of such guide rail 46. Pivot post 126 is pivotally connected to the support bracket 124 by means of a pivot pin 128, while pivot post 127 is pivotally connected to the support bracket 125 by a pivot pin 129.

FIGS. 6–8 show the guide rail 46 in one of its extended or test positions wherein the principal plane of curvature of the guide rail 46 (a plane perpendicular to the axis of revolution for the curved surface of body portion 46a and passing through the midsection of such body portion 46a) extends at right angles to the principal diametrical plane of the meridian ring 120 (a plane passing through the center of the area enclosed by the ring 120 and extending radially outward through the midsection of the ring 120). FIG. 2, on the other hand, shows the guide rail 46 in the retracted or stowed position wherein the guide rail 46 is vertically disposed adjacent the meridian ring 120 (hidden behind frame member 45b in FIG. 2). The retracted or stowed position is also indicated in FIG. 7 by the broken line construction 46'.

The field mapping assembly 44 also includes test object means, represented by a mapping projector 130, movably mounted on the guide rail 46 for movement about the head of the subject 14 being tested. This mapping projector 130 includes a housing 131 mounted on and extending inwardly from a support plate 132, the latter having rearwardly-extending angle-shaped arms 133 (FIG. 8) which extend over and down behind the cylindrical body portion 46a of the guide rail 46. A pair of such arms 133 are hooked over the top edge of the guide rail body portion 46a, while a second pair of such arms 133 (not visible) are hooked over the bottom edge of the guide rail body portion 46a. Each such arm 133 is provided with a U-shaped nylon or Teflon bushing which provides the actual engagement with the guide rail 46. Such bushings enable a smooth sliding movement of the mapping projector 130 around the track defined by the cylindrical body portion 46a of the guide rail 46. Rotatably mounted on the front or inward side of the housing 131 is a color wheel 134 having a series of angularly spaced ports 135. An optical filter is mounted in each of these ports 135. One of these filters is a clear or achromatic filter, while the remainder of these filters are color filters of different colors. Located within the interior of the housing 131 is a source of white light and an appropriate optical system for projecting a beam of such light out of a port in the housing 131 which is directly behind and in line with the uppermost one of the color wheel ports 135 in FIG. 7. Thus, when the clear filter is before the light port in the housing 131, the subject 14 sees a white spot of light and, when one of the color filters is before the light port, the subject 14 sees a colored light spot of the same color as the filter. The light port is sized so that the light spot subtends a 2° visual angle. The color of the light spot is changed by rotation of the color wheel 134. This may be done either manually or automatically by means of a small electric motor mounted on the side of the projector housing 131.

A motor powered drive system (not shown) is provided for moving the mapping projector 130 along the guide rail 46. This drive system includes an electric motor which is secured to the flange 46b of the guide rail 46 near the rearwardmost point on such guide rail 46 (as viewed in FIG. 8). Such system further includes a pair of pulleys which are individually rotatably mounted at opposite ends of the guide rail 46 on the outer side of the cylindrical body portion 46a above the flange portion 46b. A pulley line is tied to one of the mapping projector arms 133, runs around the exterior of the guide rail 46, over the pulley at one end thereof and back around the guide rail 46 to the rearwardly located driving motor. At this point, the pulley line is wrapped around a pulley mounted on the motor shaft and then continues on around the guide rail 46 to the other end thereof, at which point it passes over the pulley at this other end, from whence it runs back to and is tied to the projector arm 133 on the other side of the mapping projector 130. Thus, by activating the driving motor to provide the proper direction of rotation the mapping projector 130 can be caused to move in either direction along the guide rail 46. Suitable limit switches (not shown) are provided at the two ends of the guide rail 46 for reversing the polarity of the driving motor when the mapping projector 130 trips either of such switches. This reverses the direction of movement of the mapping projector 130. An appropriate read-out potentiometer is coupled to the projector drive system motor for providing a signal indicative of the position of the mapping projector 130 on the guide rail 46.

The extent of the guide rail 46 and the dimensions of the mapping projector 130 are such that the light spot provided by the mapping projector 130 can traverse a total angle somewhat greater than 180°. In the illustrated embodiment, the total angle traversed by the center of the light spot is on the order of 190°.

The field mapping assembly 44 also includes fixation target means, represented by a fixation projector 136, carried by the guide rail 46 at a fixed location thereon for providing a stationary fixation target in line with the visual center axis of subject 14. The fixation projector 136 includes a projector housing 137 mounted on a support plate 138 which is supported at a fixed location inwardly of the guide rail 46 by a pair of support brackets 139 and 140. As indicated of FIG. 6, for the support bracket 140, these support brackets 139 and 140 extend rearwardly below the guide rail 46 and have upwardly-curving approximately C-shaped rearward ends with the upper ends of the C's being secured to the backside of the guide rail 46 immediately below the flange 46b. Located within the projector housing 137 is a light source and an optical system for projecting a beam of light out of an exit port 141 formed in the front side of the projector housing 137. The center of the port or window 141 is in line with the center axis of the meridian ring 120. Thus, rotation of the meridian ring 120 does not change the location of the fixation target window 141. As indicated in FIG. 8, the fixation projector housing 137 is located a sufficient distance inwardly of the guide rail 46 so that the mapping projector 130 can pass therebehind.

A retracting mechanism is provided for moving the guide rail 46 from its extended to its retracted position or vice versa. This retracting mechanism includes an electric motor 142 which is mounted on the inside of the meridian ring 120 at the bottom thereof. It also includes a series of pulleys 143, 144 and 145 which are rotatably mounted on support posts which are secured to the inside of the meridian ring 120. The retracting mechanism further includes additional pulleys 146 and 147 which are rotatably mounted on a support block 148 which is also secured to the inside of the meridian ring 120. A double sector spooling drum 149 is mounted on the downwardly extending drive shaft of the motor 142. A first pulley line 150 is secured in one sector of the spooling drum 149 and several turns thereof are wrapped around such spooling drum sector. The free and of this pulley line 150 leaves the spooling drum 149, passes over pulleys 144 and 143 and then runs upwardly and is fastened to the rear end of the bracket arm 139 for the fixation projector 136. A second pulley line 151 is secured to the other sector of the spooling drum 149 and several turns thereof are wrapped around such spooling drum sector. The free end of pulley line 151 leaves the spooling drum 149 and passes over pulleys 145, 146 and 147 and then runs forwardly to and is fastened to the right forward corner of the guide rail 46.

The guide rail 46 is moved to its retracted or stowed position (broken line construction 46' in FIG. 7) by operating the motor 142 to cause a clockwise rotation of the spooling drum 149. This reels in the pulley line 151 and pays out the pulley line 150. This swings the forward end of guide rail 46 downwardly and rearwardly until the guide rail 46 is positioned vertically against the meridian ring 120 in the manner depicted in FIG. 2. In order to raise or extend the guide rail 46 to the test position, the motor 142 is operated to cause a counterclockwise rotation of the spooling drum 149. This reels in the pulley line 150 and pays out the pulley line 151. This pulls the rearward end of the fixation projector bracket 139 and hence the rear end of the guide rail 46 in a downwardly direction, the resulting pivoting action moving the guide rail 46 to the horizontal extended position depicted in FIGS. 6-8.

The ability of the meridian ring 120 to rotate around its center axis enables the visual field of the subject 14 to be mapped in several different meridian planes. For the horizontal guide rail position shown in FIGS. 6-8, the visual field is mapped in the zero degree meridian plane. By rotating the meridian ring 120 through an angle of 45°, the guide rail 46 is cocked at a 45° angle and the visual field is mapped in a 45° meridian plane. Similarly, by rotating the meridian ring 120 through angles of 90° and 135°, the visual field can be mapped in these 90° and 135° meridian planes. For purposes of controlling the angular positioning of the guide rail 46, a series of axially extending posts or cams (not shown) are secured to the meridian ring 120 at spaced points therearound. These cams cooperate with various stationary limit switches (not shown) secured to frame members 45a–45d for providing signals indicating when the meredian ring 120 is in its different rotational positions.

Considering now the operation and use of the field mapping apparatus 44, the operator should first check to see that the stereo separator plate 112 has been removed from the vision testing apparatus. The retracting or stowing motor 142 is then operated to move the guide rail 46 to its extended horizontal test position as shown in FIGS. 6–8. Preferably, the field mapping tests are performed on one eye at a time, the other eye being covered by an appropriate eye patch secured to the head of the subject 14. After putting on the eye patch, the subject 14 is instructed to place his head into the opening in the head seal 19 in the appropriate manner. If desired, the chin rest 32 and forehead rest 33 can be readjusted so that the eye to be tested is centered on the fixation target window 141 when looking straight ahead.

For sake of an example, it will be assumed that the first series of tests are to be performed on the right eye with the color wheel 134 on the mapping projector 130 set to provide a spot of white light as the moving test object. Assuming that the guide rail 46 is in the horizontal or zero degree meridian position, the mapping projector 130 is moved to its starting position at the right hand extremity of the guide rail 46. The subject 14 is instructed to stare straight ahead at the fixation target provided by the fixation projector 136 and to push the mark button 25 the instant the moving test object provided by the mapping projector 130 becomes visible or disappears. The mapping projector 130 is then started on its journey around the guide rail 46. After reaching the left hand extremity of guide rail 46, the driving motor is reversed and mapping projector 130 journeys back to the right hand end of guide rail 46. If desired, more than one back and forth trip can be made for each test. In addition to recording the mark signals produced by the mark button 25, the recorder 28 also records the analog position signal produced by the mapping projector dirve system readout potentiometer during the journey of the mapping projector 130 around the guide rail 46 and back again. This enables the recorded mark signals to be correlated with the mapping projector position at the time of occurrence of such mark signals.

The foregoing mapping process is repeated for the 45°, 90° and 135° meridian planes. Following this, a similar series of white test object tests may then be performed on the left eye, the eye patch at this time being placed over the right eye of the subject 14. Following completion of the white test object tests, the color wheel 134 on the mapping projector 130 is set to a different filter position and the visual fields for the right eye and the left eye are mapped for a test object of a different color. Thereafter, the field mapping is again repeated for the other filter positions on the color wheel 134. By way of example only, the visual fields may be mapped for test objects of the following colors: white, red, green, yellow and blue. As is apparent, the visual field may also be mapped along various additional meridian planes, in addition to the four specific meridian planes set forth above.

DARK ADAPTATION AND BRIGHTNESS THRESHOLD TESTING ASSEMBLIES

The dark adaptation and absolute brightness threshold tests are performed by means of the projector assembly 47 and the mirror assembly 48, the latter being suspended below the carriage 50 of the phoroptor assembly 36. Considering first the projector assembly 47 and referring to the front elevational view thereof as shown in FIG. 5, it is seen that such assembly includes an inverted L-shaped housing 160 having an upper horizontally-extending housing leg 160a and a right-hand vertically-extending housing leg 160b. Centrally located on the forward wall of the upper housing leg 160a is a large viewing screen 161. Located nearer the left-hand side of the upper housing leg 160a is a small viewing screen 162. As can be seen by reference to FIG. 9, the large viewing screen 161 and the small viewing screen 162 are located at a position higher than the uppermost point on the field mapping guide rail 46 when such guide rail 46 is in its retracted or stowed position.

Figure 10:
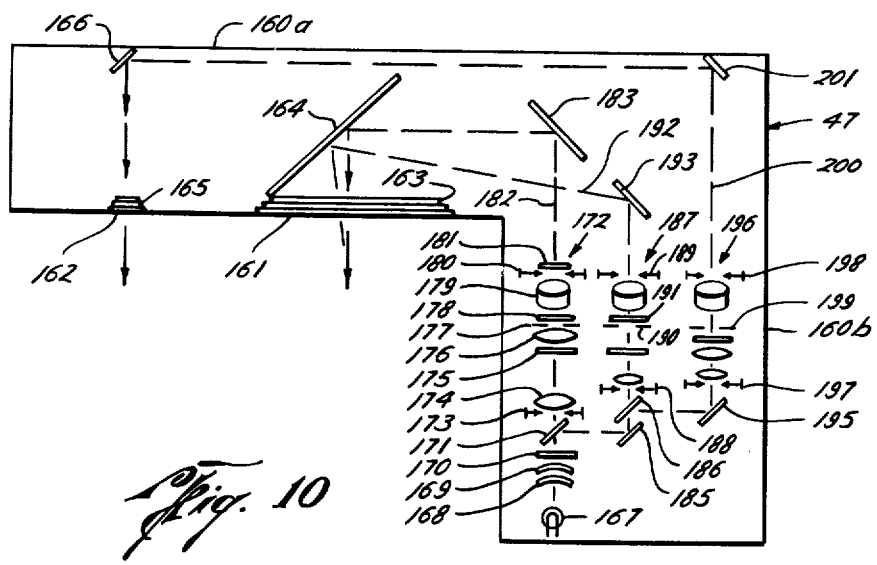
FIG. 10 is a schematic optical diagram of various optical components contained within the dark adaptation projector assembly.

Referring to FIG. 10, there is indicated in a schematic manner the various major optical elements located within the interior of the projector housing 160. For simplicity of illustration and ease of understanding, FIG. 10 shows a plan view of the elements contained within the upper housing leg 160a and an elevational view of the elements contained within the right-hand housing leg 160b. The large viewing screen 161 is formed of light-diffusing ground glass and a Fresnel lens 163 is mounted against the backside thereof. A mirror 164, cocked at approximately a 45° angle, is mounted behind the Fresnel lens 163. Similarly, the small viewing screen 162 is formed of light-diffusing ground glass and a Fresnel lens 165 is mounted against the backside thereof. A further mirror 166, cocked at an angle of approximately 45°, is located behind the Fresnel lens 165.

Located within the vertically-extending right-hand housing leg 160b are a set of three light projector mechanisms for projecting separate beams of light onto the viewing screens 161 and 162. All three projector mechanisms are powered from a common light source 167 which may, for example, take the form of a 100-watt quartz iodide lamp. Light rays from the light source 167 are directed by way of a pair of biconvex lenses 168 and 169 through a plate 170 of opal glass and onto a partially-silvered beam-splitting mirror 171. Part of the light beam passes through the partially-silvered mirror 171 and into a first light projector mechanism 172. This first light projector mechanism 172 includes, in the order named, an adjustable iris diaphragm 173, a lens 174, an opal glass plate 175, a lens 176, an adjustable (8° or 15° aperture) light mask 177, a neutral density filter 178, a triplet lens 179, a second adjustable iris diaphragm 180 and a glass plate 181. The resulting beam of white light 182 emerging from this projector mechanism 172 is reflected by a mirror 183 and the previously-considered mirror 164 through the Fresnel lens 163 and onto the viewing screen 161. The adjustable light mask 177 can be set to provide an 8° adaptation test field on the large viewing screen 161, the outer limits of such 8° adaptation test field being indicated at 184 in FIG. 5. This adaptation test field 184 is of circular shape and of a white or achromatic color. Alternatively, the adjustable light mask 177 can be set to project onto the viewing screen 161 a 15° circular adaptation field of approximately the same diameter as the large viewing screen 161. The adjustable iris diaphragms 173 and 180 are geared to the drive shaft of an electric servo motor (not shown) also having an adjustment-indicating readout potentiometer (not shown) connected to the drive shaft thereof. Such servo motor and readout potentiometer are interconnected with appropriate circuit elements to form a servor feedback loop. Adjustment of the iris diaphragm 173 and 180 changes the size of the iris openings and, hence, serves to vary the brightness or intensity of the adaptation fields produced on the viewing screen 161. The use of the double iris diaphragm arrangement provides a very wide dynamic range of brightness levels.

The light beam from the light source 167 is further deflected by the partially-silvered beam-splitting mirror 171 onto a fully-silvered mirror 185 which, in turn, deflects this part of the light beam onto a second partially-silvered beam-splitting mirror 186. Part of this light beam passes through the partially-silvered mirror 186 and into a second light projector mechanism 187. This second projector mechanism 187 is similar to the first projector mechanism 172. As such, it includes a pair of adjustable iris diaphragms 188 and 189 which are geared to the drive shaft of an electric servo motor (not shown) also having an adjustment-indicating readout potentiometer (not shown) connected to the drive shaft thereof for providing a signal indicative of the size of the iris openings. The projector mechanism 187 differs from the projector mechanism 172 in that the mechanism 187 includes a light mask 190 having an aperture in the form of a small cross. Also, the projector mechanism 187 is provided with a red optical filter 191, an opposed to the neutral density filter 178 of the first projector mechanism 172. The beam of red light 192 emerging from this second projector mechanism 187 is deflected by a mirror 193 and the previously-considered mirror 164 through the Fresnel lens 163 and onto the backside of the large viewing screen 161. The image pattern projected onto the viewing screen 161 by this second projector mechanism 187 is in the form of a small red cross, as indicated at 194 in FIG. 5. As will be seen, this red cross 194 is used for eye fixation purposes, that is, the cross 194 provides a visual fixation target. Adjustment of the iris diaphragms 188 and 189 serves to vary the brightness or intensity of this fixation target 194.

The other part of the light beam from mirror 185 is reflected by the partially-silvered beam-splitting mirror 186 onto a fully-silvered mirror 195 which, in turn, serves to deflect same into a further light projector mechanism 196. This third projector mechanism 196 is similar to the ones previously considered. As such, it includes a pair of adjustable iris diaphragms 197 and 198, the adjustment mechanisms of which are geared to the drive shaft of an electric servo motor to which drive shaft is also coupled a position-indicating readout potentiometer providing a signal indicative of the size of the iris openings. The projector mechanism 196 differs from the others in that it includes a light mask 199 having a center aperture sized to project a 2° circular target onto the small viewing screen 162. The resulting beam of white light 200 emerging from the projector mechanism 196 is deflected by a mirror 201 and the previously-considered mirror 166 through the Fresnel lens 165 and onto the backside of the small viewing screen 162. With respect to the eye of the subject 14, as seen by way of the optical system to be considered hereinafter, the center of the small viewing screen 162 is displaced from the center of the large viewing screen 161 by a visual angle of 20°. As will be seen, the 2° target on the small viewing screen 162 is used for purposes of testing the absolute brightness threshold of the subject 14. The brightness of the image projected onto the small viewing screen 162 is controlled by the size of the openings in the adjustable iris diaphragms 197 and 198 and, as such, can be varied by proper activation of the motor which is geared to the adjustment mechanisms thereof.

Considering now the details of the retractable mirror assembly 48, such mirror assembly 48 includes upper and lower mirrors 202 and 203 located below the carriage 50 of the Phoroptor assembly 36. The mirror assembly 48 also includes means for extending and retracting the mirrors 202 and 203 whereby in the extended position (FIG. 9) the lower mirror 203 is in line with the eyes of the subject 14 and tilted in a direction to deflect the line of sight 204 toward the upper mirror 202 and the upper mirror 202 is in line with the large viewing screen 161 of the projector assembly 47 and tilted in a direction to further deflect the line of sight 204 toward such viewing screen 161. More particularly, the mirrors 202 and 203 are retractably hung from the Phoroptor carriage 50 and, as indicated in FIGS. 2 and 6, the apparatus includes means for holding the mirrors 202 and 203 in a retracted or stowed position closely adjacent the underside of the Phoroptor carriage 50. FIG. 2 shows the case where the Phoroptor carriage 50 is in its down position, while FIG. 6 shows the case where the Phoroptor carriage 50 is in its up position. As there seen, the mirrors 202 and 203, when stowed, are held closely adjacent to one another and close to the underside of the Phoroptor carriage 50 and ride up and down with such carriage 50.

Figure 9:
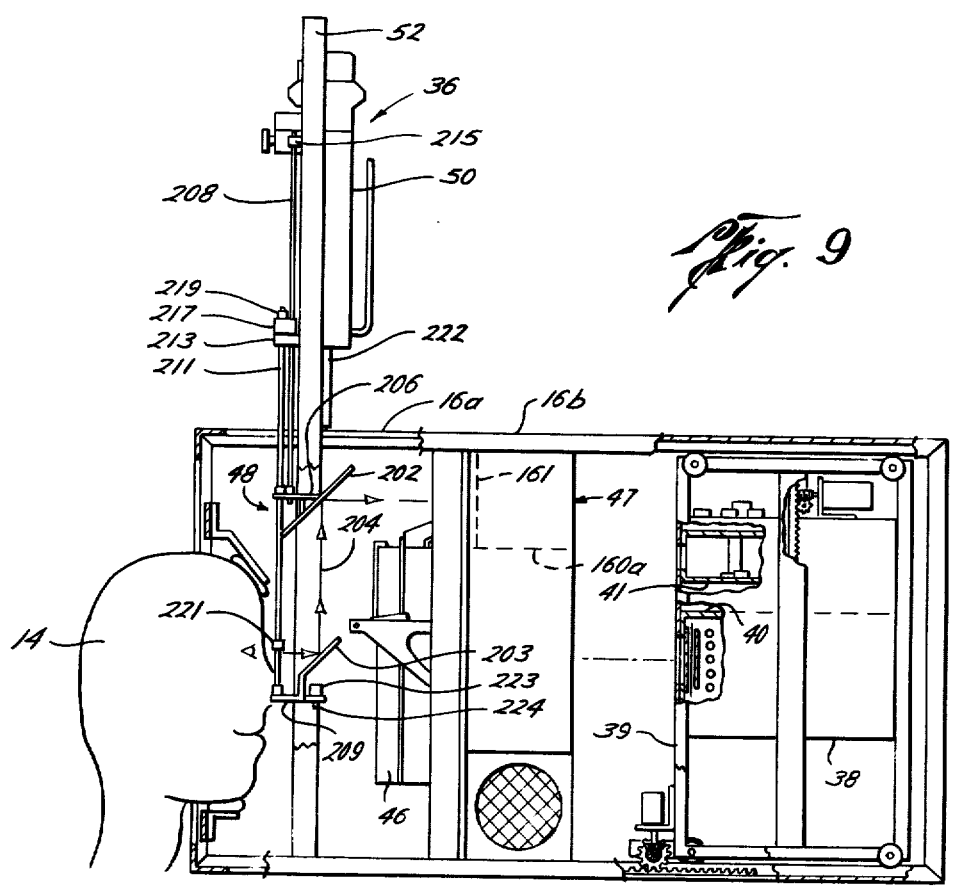
FIG. 9 is a side elevational view of the vision testing apparatus similar to FIG. 2 but showing the optical assemblies in their dark adaptation testing positions.

As best seen in FIGS. 3 and 9, the upper mirror 202 is mounted on an upper carriage 206 which is secured to the lower ends of a pair of vertically-extending guide rods 207 and 208 located at opposite sides of the Phoroptor carriage 50. The lower mirror 203 is mounted on a lower carriage 209 which is secured to the lower ends of a second pair of vertically-extending guide rods 210 and 211. As indicated in FIGS. 4 and 6, the upper mirror guide rods 207 and 208 are located in back of the lower mirror guide rods 210 and 211. The lower mirror guide rods 210 and 211 extend through appropriate cylindrical passageways in the upper mirror carriage 206, these passageways being sized to enable the rods 210 and 211 to slide therein.

Guide rods 207, 208, 210 and 211 are positioned relative to the Phoroptor carriage 50 by means of guide blocks 212 and 213 which are secured to the Phoroptor carriage 50 at opposite lower corners thereof. Left-hand guide rods 207 and 210 slidably extend through vertical passageways in the left guide block 212, while right-hand guide rods 208 and 211 slidably extend through vertical passageways in the right guide block 213. An additional pair of guide blocks 214 and 215 are secured to the Phoroptor carriage 50 at opposite upper corners thereof. The rearward guide rods 207 and 208 slidably extend through vertical passageways in respective ones of the upper guide blocks 214 and 215. A pair of sliding guide blocks 216 and 217 are pinned to respective ones of the rearward guide rods 207 and 208 at intermediate points along the lengths thereof. These sliding guide blocks 216 and 217 are not attached to the Phoroptor carriage 50. They are pinned to the rearward guide rods 207 and 208. The forward guide rods 210 and 211 slidably extend through appropriate vertical passageways located in the forward portions of these sliding guide blocks 216 and 217. A pair of stops 218 and 219 are pinned to the upper ends of respective ones of the forward guide rods 210 and 211. A second pair of stops 220 and 221 are also pinned to the forward guide rods 210 and 211, respectively, a short distance above the lower ends thereof. These lower stops 220 and 221 maintain the desired spacing between the upper and lower mirror carriages 206 and 209 in the stowed position.

Mirrors 202 and 203 are held in their stowed position by means of a releasable locking mechanisms which includes a latch bar 222 which is secured to the underside of the Phoroptor carriage 50 and extends vertically downward therefrom. The lower end of the latch bar 222 is bent horizontally to the left to provide a horizontally-extending foot portion having a slot therein. This slot cooperates with a lock member forming part of a latching device 223 which is secured to a rearward extension of the lower mirror carriage 209. This latching device 223 includes a downwardly-extending plunger 224 which is adapted to engage a bottom frame member 225 of the chassis structure 16 for purpose of causing rotation of the lock member within the latching device 223. Each time the plunger 224 strikes the frame member 225, it causes a 90° rotation of such lock member. In one position, the lock member lines up with the slot in the foot of the latch bar 222 and in the other position it extends over and above the sides of such slot. Thus, for one position, the latch bar 222 is locked to the lower mirror carriage 209 and, for the other position, it is unlocked and free to move away therefrom. Thus, alternate raising and lowering of the Phoroptor carriage 50 so as to drive the plunger 224 against the frame member 225 serves to alternately lock and unlock the mirror assembly 48 or vice versa, depending on the last previous condition of the latching device 223. As an alternative, an appropriate form of solenoid-operated latching device could instead be provided.

FIG. 6 shows the mirror assembly 48 in its retracted or stowed condition, while FIG. 9 shows the mirror assembly 48 in its extended or test position. Assuming that the Phoroptor assembly 36 is in the up position of FIG. 6 and that the field mapping guide rail 46 has been retracted, then in order to unlock the mirror assembly 48 and to move the mirrors 202 and 203 to their test positions, the Phoroptor assembly 36 is moved to its down position and then returned to its up position. Movement to the down position actuates the latching device plunger 224 to unlock the lower mirror carriage 209 from the latch bar 222. The subsequent upward movement of the Phoroptor carriage 50 causes the mirrors 202 and 203 to assume the test positions shown in FIG. 9. This is accomplished by way of sliding movement of the vertical guide rods 207, 208, 210 and 211 in the various guide blocks, such guide rods being cause to move to their lowermost positions by the weight of the mirror carriages 206 and 209. As indicated in FIG. 9 for the right-hand guide rods, the rearward guide rods 207 and 208 move downwardly relative to the Phoroptor carriage 50 until the sliding guide blocks 216 and 217 come into contact with the fixed guide blocks 212 and 213. Similarly, the forward guide rods 210 and 211 move downwardly relative to the Phoroptor carriage 50 until the stops 218 and 219 located at the upper ends thereof come into contact with the guide blocks 216 and 217. This places the mirrors 202 and 203 in the position indicated in FIG. 9. In these positions, the subject 14 may look directly ahead into the lower mirror 203 and, by means of this mirror and the upper mirror 202, view the viewing screens 161 and 162 located on the front side of the upper leg 160a of the projector housing 160. The length of the resulting optical path from the subject 14 to the center of the large viewing screen 161 may be, for example, 18 inches.

A typical procedure for using the projector assembly 47 and the mirror assembly 48 to perform the dark adaptation and absolute brightness threshold tests will now be considered. In the procedure to be considered, the dark adaptation test will be performed first, after which will be performed the brightness threshold test. These tests are preferably performed in a monocular manner. Thus, it will be assumed that the right and left eyes are tested separately, an eye patch being placed over the eye not being tested. In both sets of tests, the apparatus is in the condition indicated in FIG. 9 whereby the subject 14 is able to observe the projector viewing screens 161 and 162 by looking into the lower mirror 203 in the manner indicated in FIG. 9.

Considering now the dark adaptation test, initially the adjustable iris diaphragms in each of the three light projector mechanisms 172, 187 and 196 are completely closed so that both viewing screens 161 and 162 are completely dark. The adjustable light mask 177 in the adaptation field projector mechanism 172 is then set to select the 15° field and the adjustable iris diaphragms 173 and 180 are set to illuminate the large viewing screen 161 at a brightness level of 100 foot-lamberts. The subject 14 is then allowed to observe the large viewing screen 161 for a sufficient length of time to provide the desired preliminary light adaptation conditioning. Following this preliminary conditioning, the light source 167 is turned off, the iris diaphragms 173 and 180 are closed and the adjustable light mask 177 is set to the 8° adaptation field position. The subject 14 is then allowed to adapt in darkness for a period of two to five minutes.

With the subject 14 properly preconditioned, the dark adaptation measurements may be commenced. Before commencing same, the subject 14 is instructed to push the mark button 25 when he first sees the red fixation cross 194 on the viewing screen 161 and to again push the mark button 25 when he first sees the white adaptation field 184 on the screen 161. The first run of the dark adaptation test is commenced by starting a ramp voltage generator circuit (located in control unit 22) which supplies a steadily increasing ramp voltage to the servo motor driving the adjustable iris diaphragms 188 and 189 in the fixation target projector mechanism 187. This increases the intensity of the red fixation cross 194 in a continuous manner. When the subject 14 first perceives the presence of the red fixation cross 194, he depresses the mark button 25. This stops the increase in the fixation cross ramp voltage and holds such voltage constant at the level existing at the moment the mark button 25 is pushed. The pushing of mark button 25 also starts a second ramp voltage generator circuit (located in control unit 22) which supplies a steadily increasing ramp voltage to the servo motor which drives the adjustable iris diaphragms 173 and 180 in the adaptation field projector mechanism 172. This causes iris diaphragms 173 and 180 to open wider and wider in a gradual and continuous manner. This increases the intensity of the white adaptation field target 184 on the viewing screen 161 in a continuous manner. The subject 14 then depresses the mark button 25 when he first perceives the presence of this adaptation field 184 on the viewing screen 161. This turns off the light source 167 and resets the ramp voltage generator circuits for both the fixation cross projector 187 and the adaptation field projector 172 to their initial conditions. This, in turn, closes the iris diaphragms for the fixation cross and adaptation field projectors 187 and 172.

The foregoing measurement run is then replaced at space intervals of time. In other words, during each of several spaced time intervals, the red fixation cross intensity is increased from zero until detected by the subject 14, then the white adaptation field intensity is increased from zero until detected by the subject 14, following which the interior of the vision testing apparatus is returned to a dark condition. Preferably, some 15 to 20 such runs are made, with the beginnings of such runs being spaced at approximately 1.5 minute time intervals.

During the making of the dark adaptation measurements, the following signals are recorded in parallel channels on the recorder 28: a clock signal or timing signal; the analog signal generated by the adjustment-indicating readout potentiometer coupled to the adjustable iris diaphragms in the fixation cross projector 187; the analog signal produced by the readout potentiometer coupled to the adjustable iris diaphragms in the adaptation field projector 172; and mark signals marking the instants of time at which the mark button 25 is depressed. From this recorded data, a curve of brightness threshold versus time can be plotted. In making such a plot, the readout potentiometer signals are converted to brightness values by means of previously prepared calibration charts. The resulting brightness threshold versus time graph indicates the manner in which the subject 14 becomes dark adapted.

The absolute brightness threshold test is performed following completion of the foregoing dark adaptation measurements. The procedure is generally the same as the foregoing except that the small laterally-displaced viewing screen 162 is used to provide the white adaptation test field. Preferably, two or more absolute brightness threshold runs are made. For each run, the field of view is initially dark. The illumination intensity of the red fixation cross 194 is then gradually increased until the fixation cross 194 is detected by the subject 14, whereupon the subject 14 depresses the mark button 25 and the fixation cross intensity is held constant. At this point, the illumination intensity of the small viewing screen 162 is gradually increased (by gradually opening iris diaphragms 197 and 198 in projector 196) until such illumination is detected by the subject 14. At this point, the subject 14 presses the mark button 25 and both viewing screens 161 and 162 go dark (light source 167 turned off). During these absolute brightness threshold runs, the following signals are recorded: a timing signal; the iris adjustment signal for projector 187; the iris adjustment signal for projector 196; and the mark signals produced by the mark button 25. The subject 14 is instructed to keep his eye fixed on the red fixation cross 194 during the making of these absolute brightness threshold runs. Since the small viewing screen 162 is at a 20° visual angle with respect to the visual axis of the eye when fixed on the fixation cross 194, it is the temporal retinal field of the subject 14 which is illuminated during the absolute brightness threshold measurements.

The foregoing dark adaptation and absolute brightness threshold measurements are useful indicators of the overall physiological status and integrity of the retina, the visual neural pathways and the associated visual cortical areas of the subject 14.

DOLMAN ROD TESTING ASSEMBLY

The optical unit 11 further includes Dolman rod apparatus for performing a Howard-Dolman type depth perception test on the subject 14. With reference to FIG. 2, this test is performed by means of the Dolman rod unit 41 carried within the rearward inner box assembly 38. Such unit 41 includes a viewing window 230 located on the forward side of the inner box assembly 38 at a point above the target viewing window 42 for the film cassette unit 40. The Dolman rod viewing window 230 is moved into the subject's line of view by operation of the inner box elevator mechanism so as to move the inner box assembly 38 to its lower position, whereas the center of the viewing window 230 is in alignment with the optical axis 43. For this test, the Phoroptor assembly 36 and stowed mirror assembly 48 are moved to the up position above chassis frame angles 16a and 16b. Also, the inner box support carriage 39 is moved to its forward or 18-inch position.

Included within the Dolman rod unit 41 are a pair of thin vertically-extending Dolman rods 231 and 232 which are adapted to undergo fore and aft movement in two parallel side-by-side tracks. Dolman rods 231 and 232 are carried by small movable support blocks 233 and 234, respectively, which are, in turn, connected to a motor driven pulley system (not shown). The pulley system is such that one direction of motor rotation moves one Dolman rod in the forward direction and the other Dolman rod in the aft direction. Conversely, the opposite direction of motor rotation reverses the direction of movement of the Dolman rods. A readout potentiometer (not shown) is coupled to the pulley system for generating a signal indicative of the distance between the Dolman rods in the fore and aft direction. During the performance of the Dolman rod test, the pulley system driving motor is controlled by way of a fore and aft movement of the toggle switch 26.

The subject 14 is instructed to operate the toggle switch 26 so as to bring the two Dolman rods 231 and 232 into side-by-side alignment with one another. The subject 14 is also instructed to depress the mark button 25 following completion of the alignment step. Recorder 28 records the analog position signal generated by the pulley system readout potentiometer and the mark signal generated by the depressing of the mark button 25. Thus, not only is the final Dolman rod spacing recorded, but there is also recorded the movement pattern leading up to this final spacing.

CRITICAL FUSION FREQUENCY TEST

The optical unit 11 further includes means for measuring the visual critical fusion frequency of the subject 14. This is accomplished by providing a flickering light source and gradually varying the flicker frequency from zero to sixty hertz and back to zero and determining the frequencies at which the flicker disappears and reappears. For this critical fusion frequency test, the various optical assemblies are arranged as shown in FIG. 2 with the exceptions that the Phoroptor assembly 36 and the stowed mirror assembly 48 are moved to their up positions above the chassis frame angles 16a and 16b and the inner box support carriage 39 is moved to its forward or 18-inch position.

The light source used for this test is the light source 111 contained within the film cassette unit 40. For this test, the film transport mechanism within the film cassette unit 40 is advanced to position in alignment with the viewing window 42 a film frame having a centrally-located transparent area which subtends an 8° visual angle. The light source 111 is connected to and energized by a variable-frequency square-wave voltage generator such that the light source 111 is turned on during half cycles of one polarity and is turned off during half cycles of the opposite polarity. A control voltage is applied to this square-wave generator for purposes of gradually and continuously varying the square-wave frequency (and hence the lamp flicker rate) from a value of zero hertz up to 60 hertz and then back to zero hertz.

The subject 14 is instructed to depress the mark button 25 when the light in the viewing window 42 appears to change from a flickering to a steady light and when it appears to change from a steady to a flickering light. Preferably, at least to ascending runs and to descending runs are made. During these tests, the recorder 28 records the analog control voltage which is controlling the square-wave generator and the mark signals produced when the mark button 25 is depressed. Since the analog control voltage is proportional to the flicker frequency, this enables a determination of the frequencies at which the mark button 25 was depressed.

CONCLUSION

From the foregoing description of a represenatation embodiment of the invention, it is seen that vision testing apparatus constructed in accordance with the invention provides in a single compact and integrated unit the necessary optical assemblies for performing a plurality of relatively complex visual tests on a human subject. As illustrated by the above-described embodiment, the number of such tests may be relatively large and different ones thereof may be considerably different in character. In addition to its compact and integrated character, the above-described optical unit has the further advantage of possessing the capability for remote control of the optical assemblies and recording and display of the test data using a suitable computer controlled data acquisition system. Thus, while the foregoing embodiment describes the use of a control unit having various switches and knobs which are manipulated by a human operator, it is to be understood that a computer controlled form of control unit may instead be used. In such case, the employment of a humana operator may be eliminated, the various positions and operating conditions of the optical mechanisms being automatically controlled by a computer program stored in the control computer. In such case, the various test data may be stored on magnetic tape for later reduction and interpretation by a qualified analyst.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

I claim:

1. A multiparameter vision tester for measuring a plurality of physiological characteristics of the eyes and visual system of a human object, comprising:

a box-like housing having a vertical extending compartment at one end, a subject viewing port located in the vertical compartment end of said housing, means about the viewing port to maintain the housing light-tight when a subject's head is positioned in testing position;

a pair of vertical rails located in the housing, adjacent the viewing port and extending into the vertical compartment;

an optical assembly mounted on said rails;

means to move said optical assembly along said vertical rails to position the optical assembly in the subject's line of sight and out of said line of sight into the vertical compartment;

a pair of horizontal rails located in the housing and extending along the bottom wall, thereof;

a carriage mounted on said horizontal rails;

means to move said carriage along said horizontal rails;

a pair of vertical rails in said carriage;

a film cassette unit having a screen mounted on said vertical carriage rails;

means to move said film cassette unit along said vertical carriage whereby the screen of said film cassette unit is alignable with the subject's line of sight through the optical assembly;

projector means to selectively provide a variety of different visual targets on said screen;

visual depth perception testing means formed of a Dolman rod assembly located on top of the film cassette unit, the Dolman rod assembly being alignable with the subject's field of view during testing for depth perception by vertical movement of the carriage, and means for manipulating said Dolman rod assembly;

means within the housing for determining the visual critical fusion frequency of the subject said visual critical fusion frequency testing means including the screen of said film cassette unit and a signal generator cooperatively associated therewith to project signals onto the screen;

field mapping means pivotally mounted on a structure within the forward end of the housing for mapping the visual field of the subject, said means stowable in a position out of the field of vision and moveable into the field of vision when the optical assembly is in the vertical compartment and field mapping is being performed;

control means for selectively performing the tests including electrical circuitry and energizing means cooperatively associated with all of said testing means for moving the selected testing means into the selected test configuration; and tabulating means cooperatively associated with the testing means for automatically recording test results.

2. The vision tester in accordance with claim 1 wherein the visual field mapping means is located near the viewing port and movable into and out of the subject's field of view and including an accurate guide rail which partially encircles the head of the subject when in the test position and a test object mounted on the guide raila wherein the test object can be moved across the subject's field of view.

3. The vision tester in accordance with claim 2 wherein the angle subtended by the accurate guide rail is somewhat greater than 180° but substantially less than 360°.

4. The vision tester in accordance with claim 2 wherein the test object means includes light source means movable along the arcuate guide reel for providing a test object in the form of a light spot.

5. The vision tester in accordance with claim 4 wherein the test object means is provided with a plurality of color filters for testing color perception of the subject.

6. The vision tester in accordance with claim 1 including electronic circuitry means cooperatively associated with the control means and all of the testing means for automatically programming the succession of tests to be performed.

7. The vision tester in accordance with claim 1 including energizing means on said carriage cooperatively engaged with said horizontal rails for moving said film cassette unit along said horizontal rails for positioning said screen of said film cassette unit in proper alignment for near or far vision tests and further including lens inserting means cooperatively engaged with said optical assembly for inserting a collimating lens in said optical assembly when performing far vision tests.

8. The vision tester in accordance with claim 6 including external programmed computer means for controlling the selection of tests.

9. A multiparameter vision tester for measuring a plurality of physiological characteristics of the eyes and visual system of a human subject comprising:

a housing having a viewing port for the subject and containing a plurality of means for testing various physiological characteristics of the eyes and visual system including at least visual acuity, visual field mapping, and stereopsis;

a motor driven elevator mechanism located adjacent the viewing port;

a front optical assembly mounted on said elevator mechanism, said optical assembly having two motor driven discs containing the requisite optics for all tests which require the subject to view a film image;

a motorized carriage for fore and aft movement of the viewing port, the carriage having a motor driven elevator mechanism;

a rear optical assembly mounted on the carriage elevator mechanism, the rear optical assembly having an automated film cassette unit containing a plurality of different visual targets;

an automated deployable automated semi-circulated meridian ring having a target cart containing selectable colors said ring pivotally mounted on a structure located in the forward end of the housing;

external test selection means for controlling the position of front optical assembly, rear optical assembly and deployable meridian ring for proper test configuration and for energizing and controlling the requisite test mechanism;

external control means cooperatively associated with all of said testing means for responding to each test; and tabulating means cooperatively associated with all of said testing means for automatically recording test results.

10. The vision tester defined in claim 9 including external programmed computer means for controlling the selection of tests.

11. The vision tester defined in claim 9 including the rear optical assembly containing an automated Dolman rod assembly for testing depth perception of the subject.

12. The vision tester defined in claim 9 including a viewing screen located near the top of the housing and the rear optical assembly contains a projector assembly capable of selectively projecting a variable intensity fixation target and variable intensity adaptation test field into the viewing screen for testing visual dark adaption characteristics and absolute brightness threshold of the subject.

* * * * *